United States Patent [19]
Mitsuishi

[11] Patent Number: 5,809,259
[45] Date of Patent: Sep. 15, 1998

[54] SEMICONDUCTOR INTEGRATED CIRCUIT DEVICE

[75] Inventor: Naoki Mitsuishi, Kodaira, Japan

[73] Assignee: Hitachi, Ltd., Tokyo, Japan

[21] Appl. No.: 777,273

[22] Filed: Jan. 6, 1997

Related U.S. Application Data

[62] Division of Ser. No. 334,641, Nov. 4, 1994.

[30] Foreign Application Priority Data

Nov. 8, 1993 [JP] Japan .................................. 5-278011

[51] Int. Cl.$^6$ ...................................................... G06F 13/00
[52] U.S. Cl. .......................................... 395/306; 395/280
[58] Field of Search ..................... 395/287, 306, 395/308, 280, 823, 800, 200.06, 311, 478

[56] References Cited

U.S. PATENT DOCUMENTS

| | | | |
|---|---|---|---|
| 4,245,301 | 1/1981 | Rokutanda et al. | 395/287 |
| 4,947,366 | 8/1990 | Johnson | 395/823 |
| 4,975,838 | 12/1990 | Mizuno et al. | 395/200.1 |
| 4,991,086 | 2/1991 | Kojima | 395/375 |
| 5,131,081 | 7/1992 | MacKenna et al. | 395/842 |
| 5,175,841 | 12/1992 | Magar et al. | 395/421.01 |
| 5,280,590 | 1/1994 | Pleva et al. | 395/309 |
| 5,379,394 | 1/1995 | Goto | 395/306 |
| 5,381,556 | 1/1995 | Mitsuishi et al. | 395/800 |
| 5,414,866 | 5/1995 | Ohmae | 395/800 |
| 5,440,752 | 8/1995 | Lentz et al. | 395/800 |

Primary Examiner—Ayaz R. Sheikh
Assistant Examiner—David A. Wiley
Attorney, Agent, or Firm—Loudermilk & Associates

[57] ABSTRACT

The invention provides a semiconductor integrated circuit device, which minimizes an increase in the physical and logical size, allows data transfers invoked by a large number of interrupts, and improves the processing efficiency. This semiconductor integrated circuit device is applied to a single chip microcomputer and includes function blocks such as CPU, data transfer controller DTC, ROM, RAMI, RAMP, timer, pulse output circuit, serial communication interface SCI, A/D converter, IOP0–11, interrupt controller, and bus controller BSC. The internal address bus IAB and the internal data bus IDB are connected to CPU, ROM, RAMI and BSC. The internal address bus PAB and the internal data bus PDB are connected to BSC, RAMP, timer, pulse output circuit, SCI, A/D converter, interrupt controller, and IOP0–11. Further, PDB is connected to DTC.

7 Claims, 29 Drawing Sheets

FIG. 2

| EXCEPTION-HANDLING ORIGINS | INTERRUPT SOURCE | VECTOR NUMBER | HEAD ADDRESS FOR VECTOR CPU | HEAD ADDRESS FOR VECTOR DTC | DTC ENABLE REGISTER |
|---|---|---|---|---|---|
| RESET | EXTERNAL TERMINAL | 0 | H'00000000 | · | · |
| (RESERVED) | | 1 | H'00000004 | · | · |
| (RESERVED) | | 2 | H'00000008 | · | · |
| NMI | EXTERNAL TERMINAL | 3 | H'0000000C | · | · |
| TRAPA INSTRUCTION 0 | | 4 | H'00000010 | · | · |
| TRAPA INSTRUCTION 1 | | 5 | H'00000014 | · | · |
| TRAPA INSTRUCTION 2 | | 6 | H'00000018 | · | · |
| TRAPA INSTRUCTION 3 | | 7 | H'0000001C | · | · |
| IRQ 0 | EXTERNAL TERMINAL | 8 | H'00000020 | H'FFFFFC20 | DTEA7 |
| IRQ 1 | | 9 | H'00000024 | H'FFFFFC24 | DTEA6 |
| IRQ 2 | | 10 | H'00000028 | H'FFFFFC28 | DTEA5 |
| IRQ 3 | | 11 | H'0000002C | H'FFFFFC2C | DTEA4 |
| IRQ 4 | | 12 | H'00000030 | H'FFFFFC30 | DTEA3 |
| IRQ 5 | | 13 | H'00000034 | H'FFFFFC34 | DTEA2 |
| IRQ 6 | | 14 | H'00000038 | H'FFFFFC38 | DTEA1 |
| IRQ 7 | | 15 | H'0000003C | H'FFFFFC3C | DTEA0 |
| CAPTURE 0 | TIMER A | 16 | H'00000040 | H'FFFFFC40 | DTEB7 |
| CAPTURE 1 | | 17 | H'00000044 | H'FFFFFC44 | DTEB6 |
| CAPTURE 2 | | 18 | H'00000048 | H'FFFFFC48 | DTEB5 |
| CAPTURE 3 | | 19 | H'0000004C | H'FFFFFC4C | DTEB4 |
| COMPARE-MATCH 0 | | 20 | H'00000050 | H'FFFFFC50 | DTEB3 |
| COMPARE-MATCH 1 | | 21 | H'00000054 | H'FFFFFC54 | DTEB2 |
| OVERFLOW | | 22 | H'00000058 | · | · |
| RESERVED | | 23 | H'0000005C | · | · |
| COMPARE-MATCH 0 | TIMER B | 24 | H'00000060 | H'FFFFFC60 | DTEC7 |
| COMPARE-MATCH 1 | | 25 | H'00000064 | H'FFFFFC64 | DTEC6 |
| OVERFLOW | | 26 | H'00000068 | · | · |
| RESERVED | | 27 | H'0000006C | · | · |
| RECEIVE END | SCI | 28 | H'00000070 | H'FFFFFC70 | DTEC3 |
| TRANSMIT END | | 29 | H'00000074 | H'FFFFFC74 | DTEC2 |
| RECEIVE ERROR | | 30 | H'00000078 | · | · |
| RESERVED | | 31 | H'0000007C | · | · |
| CONVERSION COMPLETION | A/D CONVERTER | 32 | H'00000080 | H'FFFFFC80 | DTED7 |
| RESERVED | | 33 | H'00000084 | · | · |
| RESERVED | | 34 | H'00000088 | · | · |
| RESERVED | | 35 | H'0000008C | · | · |

FIG. 6

| BIT 15 | BIT 14 | DESCRIPTION |
|---|---|---|
| SM 1 | SM 0 | |
| 0 | 0 | THE CONTENTS OF SAR IS FIXED |
| 0 | 1 | THE CONTENTS OF SAR IS FIXED |
| 1 | 0 | THE CONTENTS OF SAR IS INCREMENTED |
| 1 | 1 | THE CONTENTS OF SAR IS DECREMENTED |

| BIT 13 | BIT 12 | DESCRIPTION |
|---|---|---|
| DM 1 | DM 0 | |
| 0 | 0 | THE CONTENTS OF DAR IS FIXED |
| 0 | 1 | THE CONTENTS OF DAR IS FIXED |
| 1 | 0 | THE CONTENTS OF DAR IS INCREMENTED |
| 1 | 1 | THE CONTENTS OF DAR IS DECREMENTED |

| BIT 11 | BIT 10 | DESCRIPTION |
|---|---|---|
| MD 1 | MD 0 | |
| 0 | 0 | NORMAL MODE |
| 0 | 1 | REPEAT MODE |
| 1 | 0 | BLOCK TRANSFER MODE |
| 1 | 1 | RESERVED |

| BIT 9 | DESCRIPTION |
|---|---|
| DTS | |
| 0 | DESTINATION SIDE IS REPEAT AREA OR BLOCK AREA |
| 1 | SOURCE SIDE IS REPEAT AREA OR BLOCK AREA |

| BIT 8 | DESCRIPTION |
|---|---|
| Sz | |
| 0 | BYTE SIZE TRANSFER |
| 1 | WORD SIZE TRANSFER |

| BIT 7 | DESCRIPTION |
|---|---|
| NXTE | |
| 0 | DTC TRANSFER COMPLETION |
| 1 | DTC TRANSFER CONTINUITY |

FIG. 7

| DATA TRANSFER MODE | SAR | DAR | TCR | | BTCR |
|---|---|---|---|---|---|
| | | | TCRH | TCRL | |
| NORMAL MODE | SOURCE ADDRESS FOR TRANSFER | DESTINATION ADDRESS FOR TRANSFER | TRANSFER COUNTER | | RESERVED |
| REPEAT MODE | SOURCE ADDRESS FOR TRANSFER | DESTINATION ADDRESS FOR TRANSFER | TRANSFER COUNTER | TRANSFER NUMBER DESIGNATION | RESERVED |
| BLOCK TRANSFER MODE | SOURCE ADDRESS FOR TRANSFER | DESTINATION ADDRESS FOR TRANSFER | BLOCK COUNTER | BLOCK SIZE DESIGNATION | TRANSFER COUNTER |

FIG. 10

| | BIT : | 7 | 6 | 5 | 4 | 3 | 2 | 1 | 0 |
|---|---|---|---|---|---|---|---|---|---|
| DTERA | | DTEA 7 | DTEA 6 | DTEA 5 | DTEA 4 | DTEA 3 | DTEA 2 | DTEA 1 | DTEA 0 |
| | INITIAL VALUE AT A RESET : | 0 | 0 | 0 | 0 | 0 | 0 | 0 | 0 |
| | R/W : | R/W | R/W | R/W | R/W | R/W | R/W | R/W | R/W |

| | BIT : | 7 | 6 | 5 | 4 | 3 | 2 | 1 | 0 |
|---|---|---|---|---|---|---|---|---|---|
| DTERB | | DTEB 7 | DTEB 6 | DTEB 5 | DTEB 4 | DTEB 3 | DTEB 2 | DTEB 1 | DTEB 0 |
| | INITIAL VALUE AT A RESET : | 0 | 0 | 0 | 0 | 0 | 0 | 0 | 0 |
| | R/W : | R/W | R/W | R/W | R/W | R/W | R/W | R/W | R/W |

| | BIT : | 7 | 6 | 5 | 4 | 3 | 2 | 1 | 0 |
|---|---|---|---|---|---|---|---|---|---|
| DTERC | | DTEC 7 | DTEC 6 | DTEC 5 | DTEC 4 | DTEC 3 | DTEC 2 | DTEC 1 | DTEC 0 |
| | INITIAL VALUE AT A RESET : | 0 | 0 | 0 | 0 | 0 | 0 | 0 | 0 |
| | R/W : | R/W | R/W | R/W | R/W | R/W | R/W | R/W | R/W |

| | BIT : | 7 | 6 | 5 | 4 | 3 | 2 | 1 | 0 |
|---|---|---|---|---|---|---|---|---|---|
| DTERD | | DTED 7 | DTED 6 | DTED 5 | DTED 4 | DTED 3 | DTED 2 | DTED 1 | DTED 0 |
| | INITIAL VALUE AT A RESET : | 0 | 0 | 0 | 0 | 0 | 0 | 0 | 0 |
| | R/W : | R/W | R/W | R/W | R/W | R/W | R/W | R/W | R/W |

FIG. 25
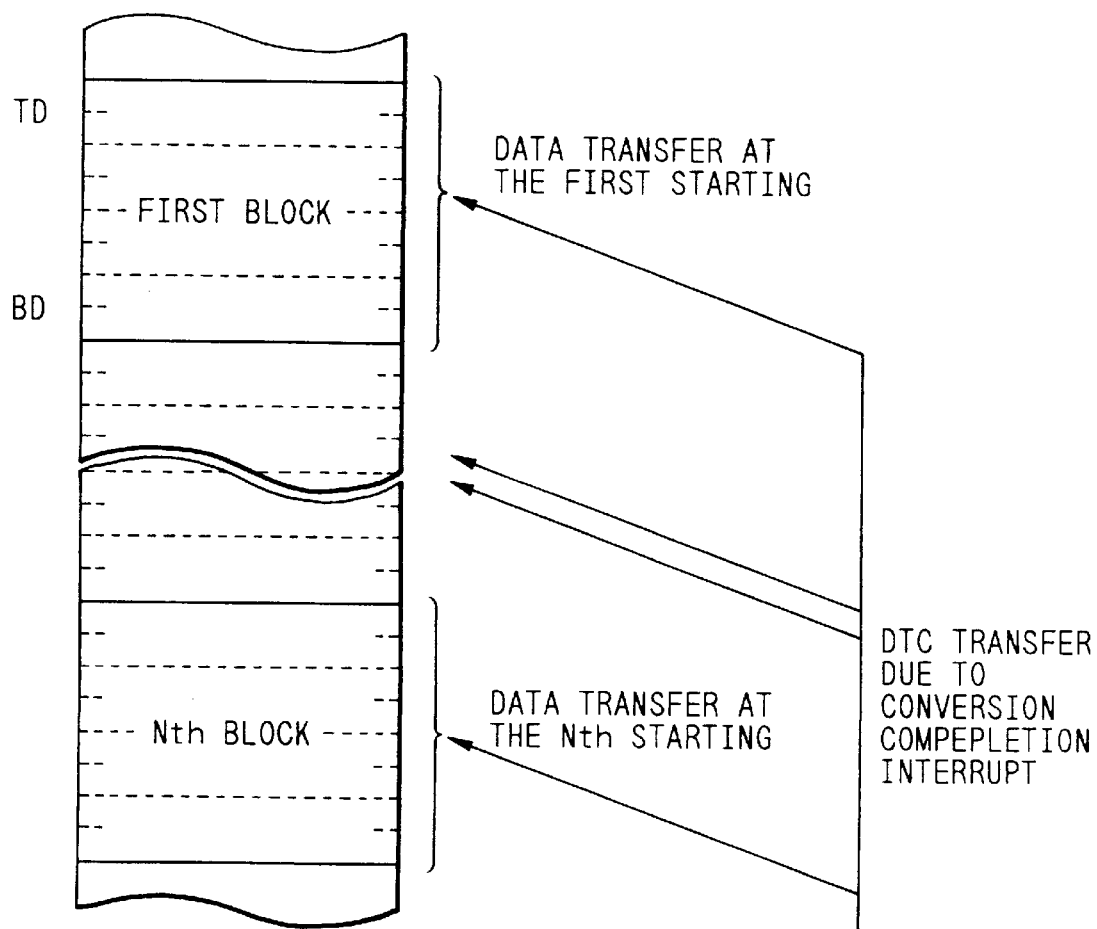
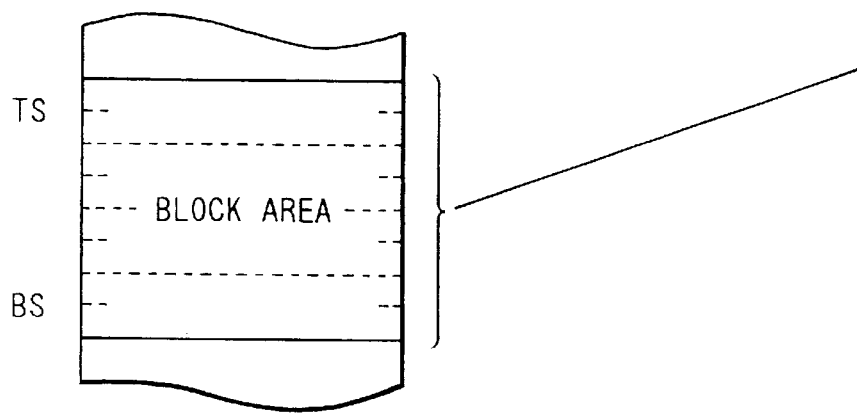

FIG. 27

| STARTING ORIGIN | SAR | DAR | MODE |
|---|---|---|---|
| IRQ 0 | CENTRONICS DATA REGISTER FIX | BUFFER RAM 32 INCREMENT | NORMAL |
| TIMER A COMPARE-MATCH 0 | RAMP REPEAT AREA INCREMENT | OUTPUT DATA REGISTER FIX | REPEAT |
|  | RAMP INCREMENT/ FIX/ DECREMENT | TIMER COMPARE REGISTER FIX | NORMAL |
| TIMER B COMPARE-MATCH 0 | OUTPUT BUFFER 1 INCREMENT | PRINTING HEAD 1 BLOCK AREA INCREMENT | BLOCK TRANSFER |
|  | OUTPUT BUFFER 2 INCREMENT | PRINTING HEAD 2 BLOCK AREA INCREMENT | BLOCK TRANSFER |
|  | OUTPUT BUFFER 3 INCREMENT | PRINTING HEAD 3 BLOCK AREA INCREMENT | BLOCK TRANSFER |
| SCI RECEIVE END | RECEPTION DATA REGISTER FIX | RAMP INCREMENT | NORMAL |
| SCI TRANSMIT END | RAMP INCREMENT | TRANSMISSION REGISTER FIX | NORMAL |

SEMICONDUCTOR INTEGRATED CIRCUIT DEVICE

This is a divisional of application Ser. No. 08/334,641 filed on Nov. 4, 1994.

BACKGROUND OF THE INVENTION

The present invention relates to a semiconductor integrated circuit device and more particularly to a technology suitably applied to a data processing device such as a single chip microcomputer and a single chip microprocessor that incorporate a central processing unit and a data transfer device.

A single chip microcomputer, as described in the "LSI Handbook," page 540–541, published by Ohmsha Ltd. on Nov. 30, 1984, generally consists of a central processing unit (CPU) and other functional blocks including a read only memory (ROM) for program storage, a random access memory (RAM) for data storage, and an input/output circuit for input and output of data, with all of these blocks formed on a single semiconductor substrate.

Such a single chip microcomputer, which further incorporates a direct memory access controller (DMAC) to enable data transfer independently of the CPU, is described in the "H8/3003 Hardware Manual," published in March 1993 by Hitachi, Ltd.

This DMAC is started by an interrupt request and has operation modes such as repeat mode and block transfer mode. This DMAC is suited for control of stepping motors and of printout data in a printer. In this example, data transfer for up to eight channels can be made. The data transfer by the DMAC, as it is independent of the CPU, needs to stop the CPU only in those bus cycles that are required for the DMAC data transfer, so that in bus cycles other than those required for the DMAC data transfer, the CPU can continue the data processing currently being executed.

Take, for example, a case where byte data are transferred to the input/output circuit by the above-mentioned DMAC and a transfer source address and a transfer destination address are incremented. Assuming that an access to RAM requires two states and an access to the input/output circuit requires three states, a single data transfer requires six states including one state of dead cycle used for DMAC internal operation. In this specification, one cycle of reference clock in the single chip microcomputer or a semiconductor integrated circuit device is defined to be one state.

Such a DMAC, however, has a transfer source address register, a transfer destination address register, a transfer counter register and a control register in each channel. Hence, if data transfer is made in a large number of channels, these registers need be provided for each of the channels.

The number of channels can be increased by limiting the number of bits of the address specification register.

The "H8/532 Hardware Manual," published in December 1988 by Hitachi, Ltd. describes a single chip microcomputer that incorporates a data transfer device, a so-called data transfer controller (DTC), in which the registers for holding transfer information, such as the transfer source address register, transfer destination address register, transfer counter register and control register, are arranged on a general-purpose RAM with high memory density to prevent an increase in the logic and physical size. This DTC allows data transfer to be performed by virtually any interrupt origin.

SUMMARY OF THE INVENTION

In the data processing device incorporating the aforementioned DTC, the general-purpose RAM used as registers holding the DTC's transfer information is connected to the same internal address bus and internal data bus as the CPU. Because the registers holding the transfer information are arranged on the general-purpose RAM, the contents of the registers holding the transfer information are read into the DTC prior to the data transfer, which is carried out according to the contents thus read in. Further, the information updated by the data transfer is saved in the registers on the RAM. This gives rise to the problem that a large amount of time is spent reading the contents of the registers holding the transfer information and saving the updated transfer information in the registers, compared to the amount of time taken by the data transfer.

Because the general-purpose RAM used as a register to hold the DTC's transfer information is connected to the same internal address bus and internal data bus as the CPU, as mentioned above, the CPU is stopped while reading and saving the contents of the register which holds the transfer information. This lowers the processing efficiency of the single chip microcomputer or semiconductor integrated circuit device as a whole. For example, when the transfer source address and the transfer destination address are incremented during the transfer of byte data, the number of states of period taken to transfer data in the preceding instance is five whereas the reading and saving of register contents requires 30 states. Therefore, for a total of 35 states the CPU's data processing is halted.

An object of this invention is to provide a semiconductor integrated circuit device, which minimizes an increase in the physical and logical size, enables data transfer by a large number of interrupts and improves the processing efficiency.

Another object of this invention is to provide a single chip microcomputer that allows efficient data transfer and efficient data processing.

These and other objects and novel features of this invention will become apparent from the following description and the attached drawings.

Representative aspects of this invention may be briefly summarized as follows.

That is, a semiconductor integrated circuit device of this invention includes: a data processing device; a data transfer device; a bus control means; a data input/output means; a first memory means; a second memory means; a first bus connected to the data processing device, the bus control means and the first memory means; and a second bus connected to the data transfer device, the bus control means, the second memory means and the data input/output means; wherein the bus control means selectively couples the first bus and the second bus.

Another semiconductor integrated circuit device of this invention includes: a data processing device; a data transfer device; a first memory means that acts as a working area for the data processing device; a second memory means for storing data transfer information of the data transfer device; a third memory means that stores a program executed by the data processing device; a first bus connected to the data processing device, the third memory means and the first memory means; a data input/output means that can request starting of the data transfer device; a second bus connected to the data transfer device, the second memory means and the data input/output means; and a bus control means that selectively couples the first bus and the second bus.

A further semiconductor integrated circuit device of this invention includes: a data processing device; a data transfer device; a plurality of memory means; and a data input/output means; wherein the addresses of the plurality of memory means and the addresses of the data input/output means can be arranged on an address space of the data processing device, and the data processing device and the data transfer device can read from or write into at least one of the plurality of memory means and the data input/output device in parallel. This semiconductor integrated circuit device further includes: a first bus to enable the data processing device to read from or write into a memory means other than the plurality of memory means; and a second bus used by the data transfer device to read from or write into the plurality of memory means.

A further semiconductor integrated circuit device of this invention includes: a data transfer device; and a memory circuit that can store at least one information among address, data, the number of data to be transferred and a transfer method, all used in a data transfer performed by the data transfer device; wherein the at least one information includes information that can specify a plurality of data transfers—each of which is based on the at least one information—performed by a single transfer operation of the data transfer device.

In the semiconductor integrated circuit device mentioned above, in which the first bus connects the data processing device, the bus control means and the first memory means and in which the second bus connects the data transfer device, the bus control means, the second memory means and the data input/output means, the connection and disconnection between the first bus and the second bus is selectively controlled by the bus control means. When the first and second buses are disconnected, the read or write operation executed by the data processing device using the first bus and the read or write operation executed by the data transfer device using the second bus can be performed parallelly.

That is, by making it possible to electrically isolate the bus (first bus) mainly used by the data processing device from the bus (second bus) mainly used by the data transfer device, the use of bus by the data processing device and the use of bus by the data transfer device can be realized simultaneously. Further, functional blocks or functional modules required for the operation of the data processing device and the data transfer device are connected to their respective buses. And a memory means that stores transfer information for the data transfer device (transfer parameters) is provided on the bus mainly used by the data transfer device so that the transfer information can be retrieved from the memory means by the data transfer device for its operation.

Because the transfer information for the data transfer device is stored in a memory means having a high memory density, the physical size on the semiconductor chip (area on the chip) of the memory means that stores the transfer information for the data transfer device can be reduced. This in turn reduces the manufacturing cost of the single chip microcomputer or semiconductor integrated circuit device or makes it possible to increase, with an appropriate size or manufacturing cost, the number of transfer channels for the data transfer device. Moreover, because the bit number in the address specification register can be made large enough and because the data processing device and the data transfer device can be made operable at the same time, the processing speed of the single chip microcomputer or semiconductor integrated circuit device can be enhanced. Provision of a third memory means for storing a program contributes to a further reduction in size of the single chip microcomputer or semiconductor integrated circuit device.

In a further semiconductor integrated circuit device of this invention, a data processing device, a third memory means and a first memory means are connected by a first bus; a data transfer device, a second memory means and a data input/output means are connected by a second bus; and the first bus and the second bus are connected by a bus control means. With this configuration, the physical size on the semiconductor chip of the second memory means that stores transfer information for the data transfer device can be reduced, which in turn reduces the manufacturing cost of the single chip microcomputer or semiconductor integrated circuit. Furthermore, because the transfer information stored in the second memory means can be increased, the number of bits of the address specification register can be made sufficiently large, permitting an efficient use of the address space and making it possible to increase the number of transfer channels for the data transfer device. These combine to improve the processing speed of the single chip microcomputer or semiconductor integrated circuit.

Similarly, a still further semiconductor integrated circuit device of this invention includes: a second bus used by the data transfer device to read from or write into a plurality of memory means; and a first bus used by the data processing device to read from or write into a memory means other than the plurality of memory means. Still another semiconductor integrated circuit device of this invention allows specifying of a transfer of at least one information in a single operation of the data transfer device. This reduces the physical size, resulting in a reduced manufacturing cost, an increase in the bit number of the address specification register, and improved processing speed of the single chip microcomputer or semiconductor integrated circuit.

BRIEF DESCRIPTION OF THE DRAWINGS

FIG. 2 is a table showing interrupt origins for the single chip microcomputer of this embodiment;

FIG. 6 is a table showing the configuration of a DTC mode register (DTMR) in this embodiment;

FIG. 7 is a table showing register functions of the DTC in this embodiment;

FIG. 10 is a diagram showing the configuration of a DTC enable register in this embodiment;

FIG. 25 is an explanatory diagram showing an example operation of the block transfer mode in this embodiment;

FIG. 27 is a table showing an example of use of the DTC in the printer controller of FIG. 26 that uses the single chip microcomputer of this embodiment;

DETAILED DESCRIPTION OF THE INVENTION

Detailed description of embodiments of this invention with reference to the accompanying drawings follows.

Figure 1:
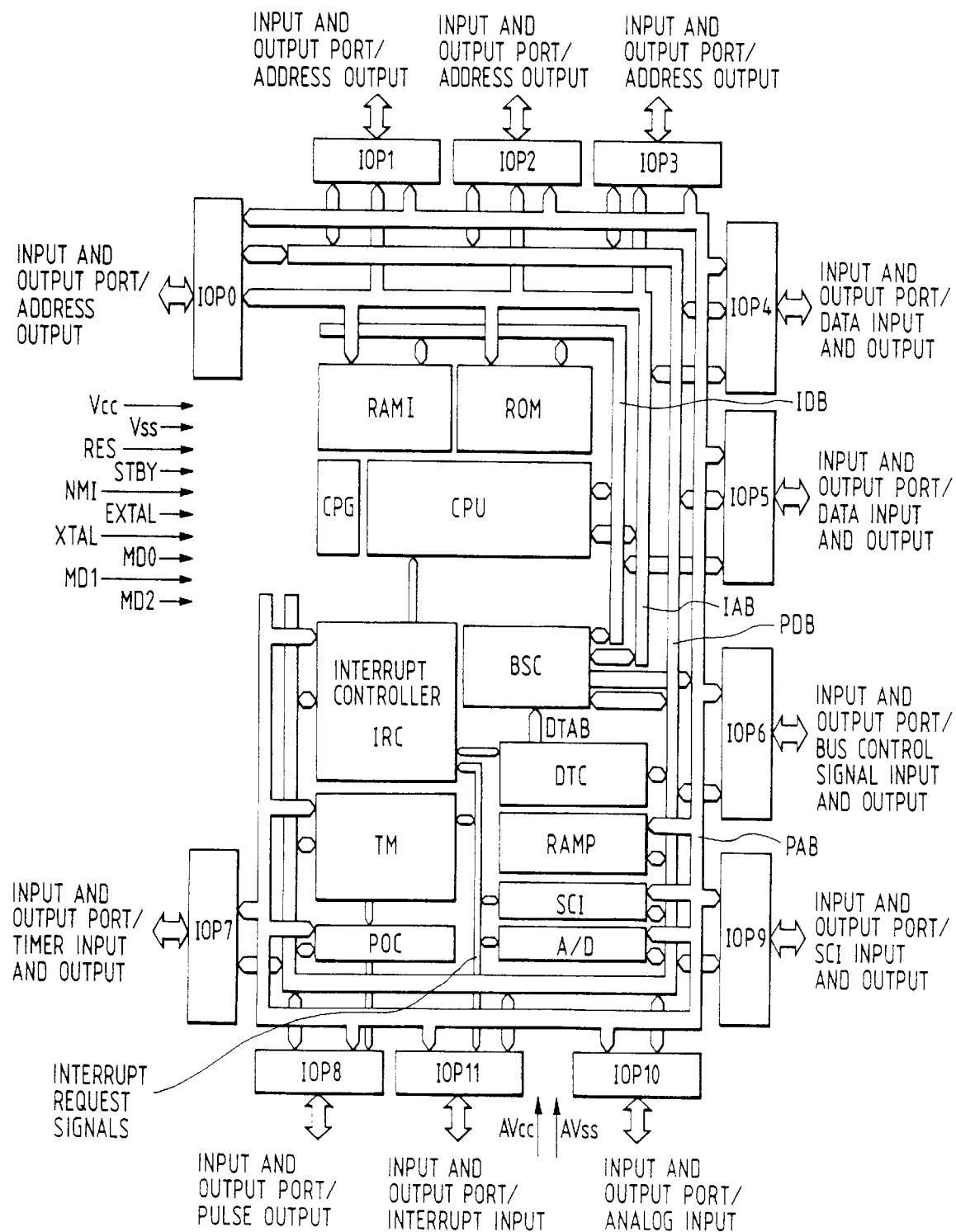
FIG. 1 is a block diagram showing an essential part of a single chip microcomputer, a semiconductor integrated circuit device that constitutes one embodiment of this invention.
Figure 3:
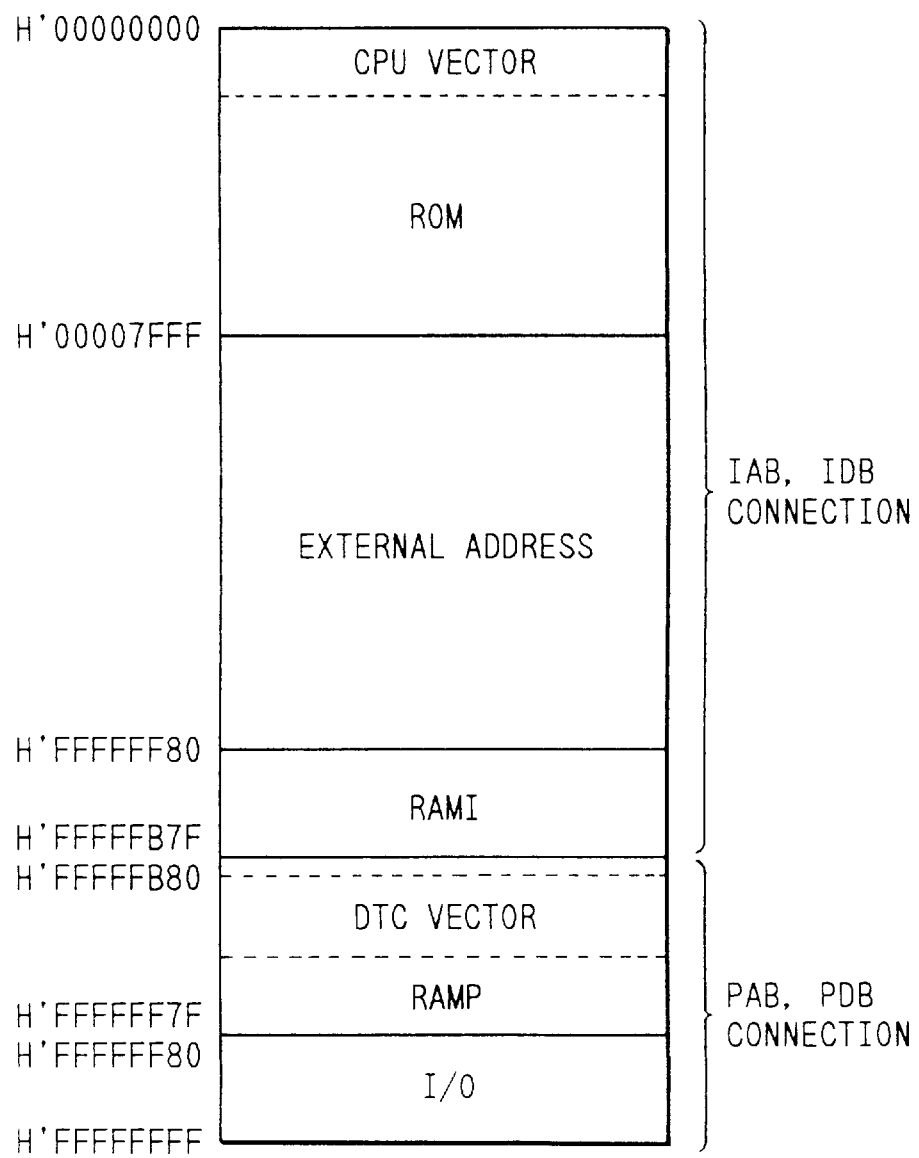
FIG. 3 is an address map in the single chip microcomputer of this embodiment.
Figure 4:
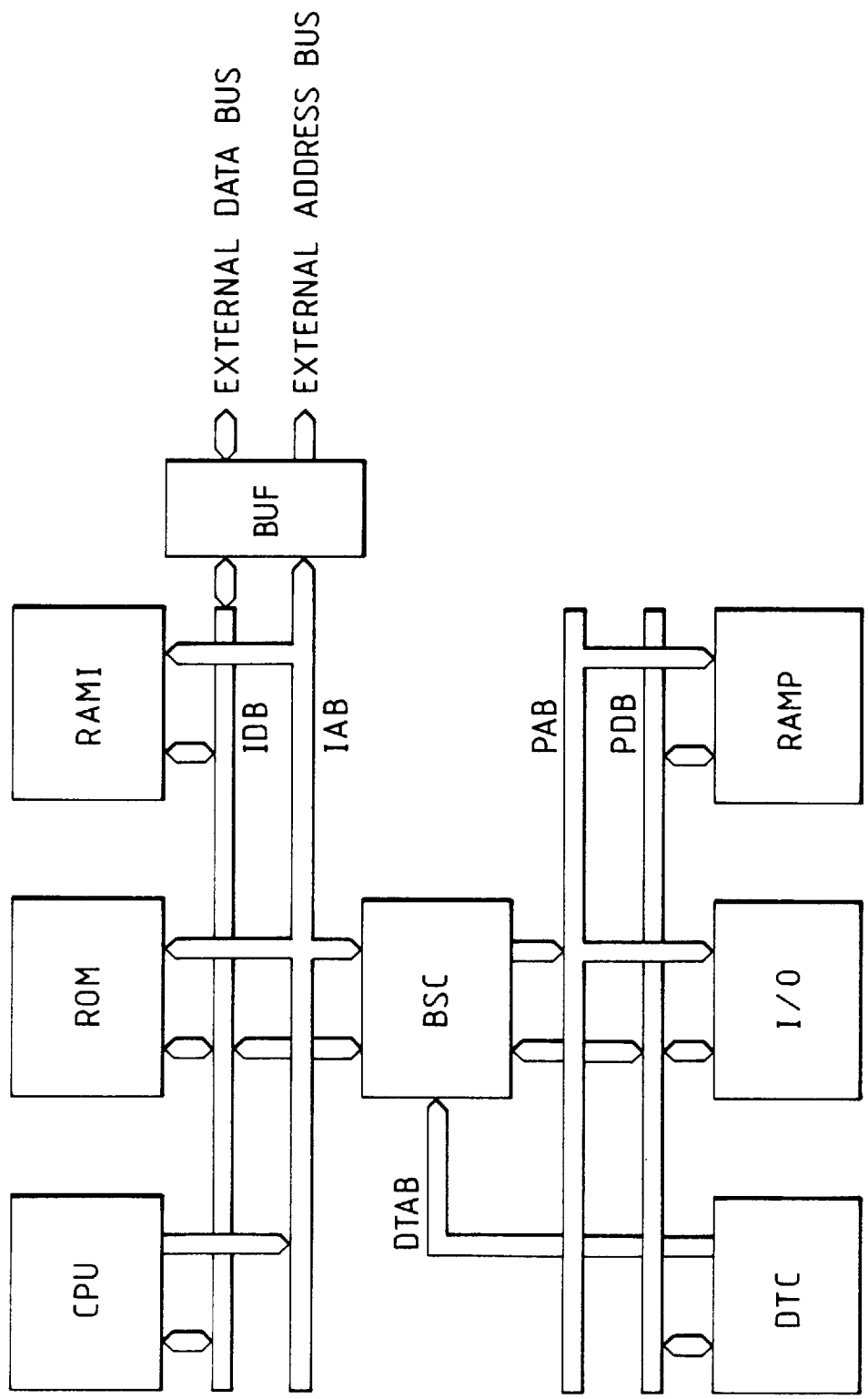
FIG. 4 is a block diagram showing the configuration of an address bus and a data bus in the single chip microcomputer of this embodiment.
Figure 23:
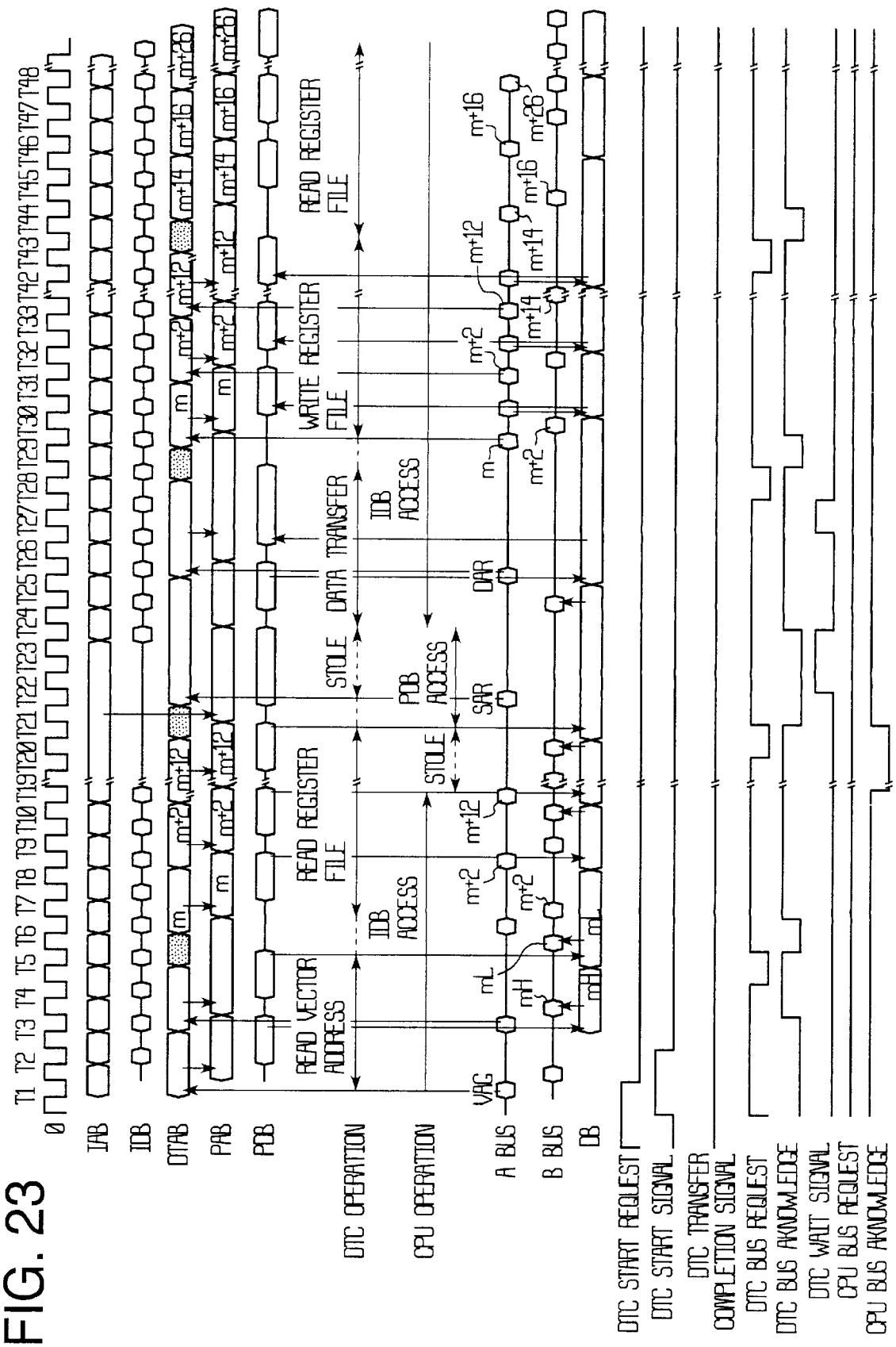
FIG. 23 is a timing diagram showing a first example of operation timing of the internal bus in this embodiment.
Figure 24:
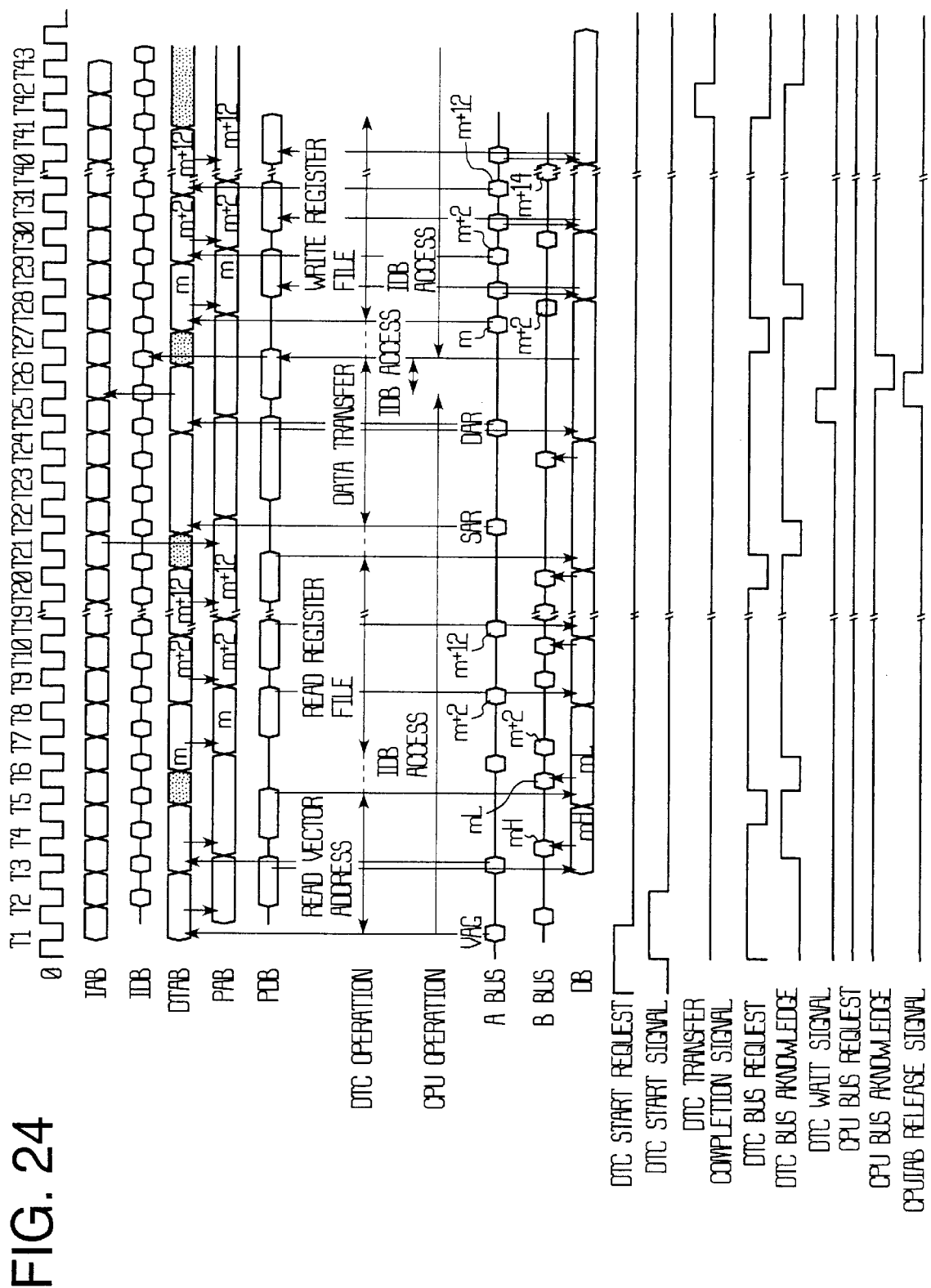
FIG. 24 is a timing diagram showing a second example of operation timing of the internal bus in this embodiment.
Figure 26:
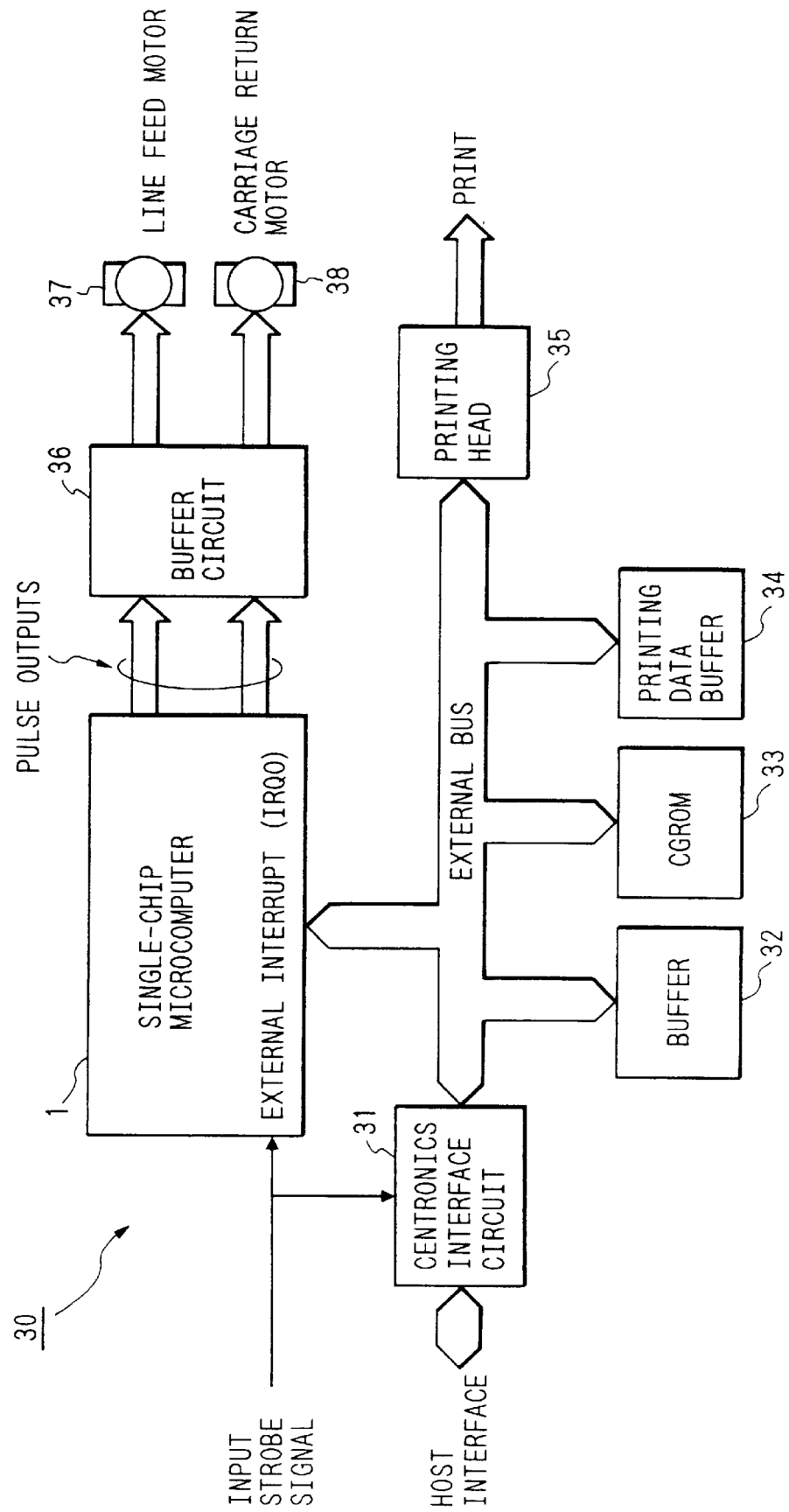
FIG. 26 is a block diagram showing an essential part of a printer controller using the single chip microcomputer of this embodiment.
Figure 28:
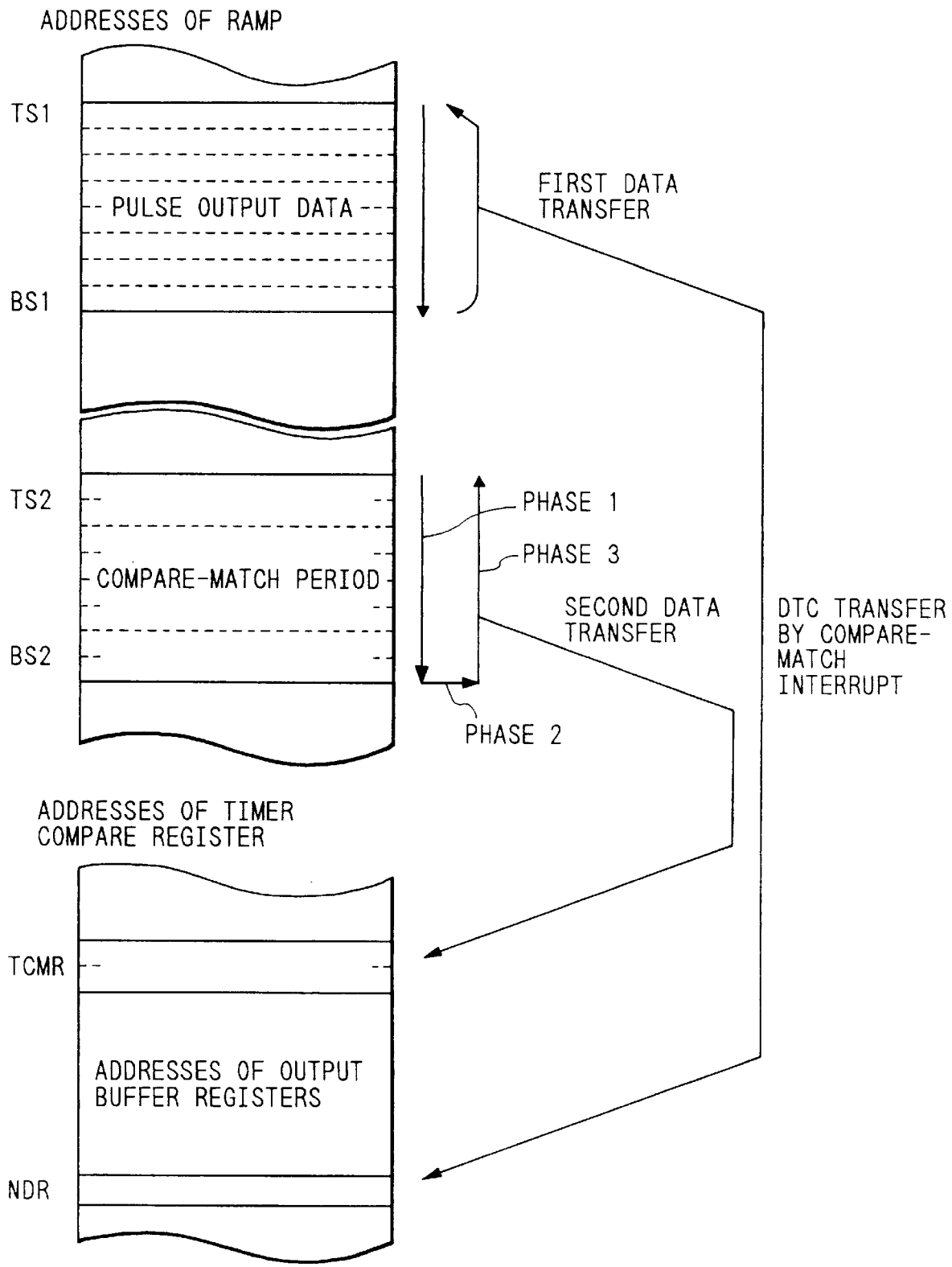
FIG. 28 is a diagram showing an example of a motor drive operation using the repeat mode in the printer controller of FIG. 26 that uses the single chip microcomputer of this embodiment.
Figure 29:
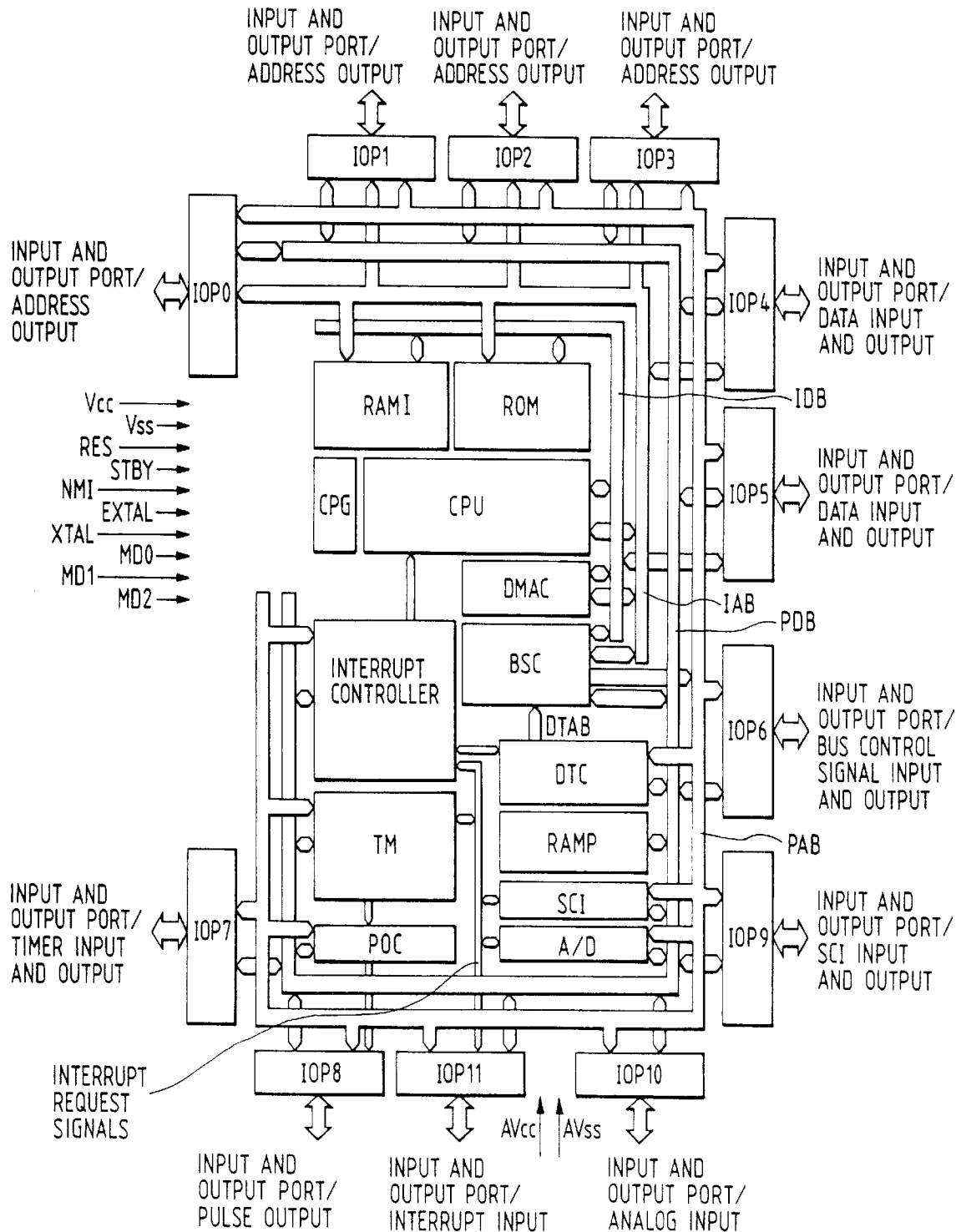
FIG. 29 is a block diagram showing an essential part of a variation of this embodiment of the single chip microcomputer.
Figure 3:
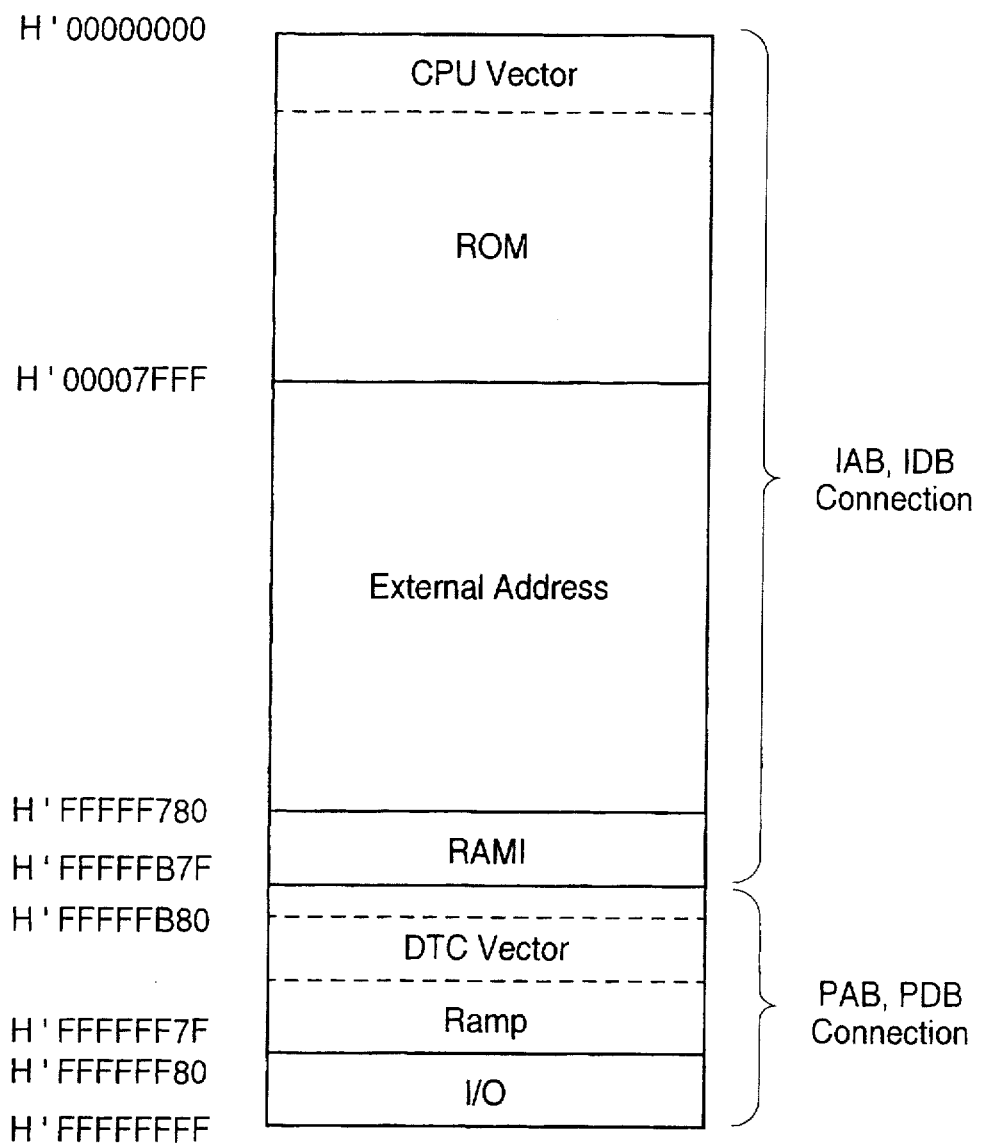

FIG. 1 is a block diagram showing an essential portion of a single chip microcomputer, a semiconductor integrated circuit device that constitutes one embodiment of this invention. FIG. 2 is an explanatory diagram showing interrupt origins for the single chip microcomputer of this embodiment. FIG. 3 is an explanatory diagram showing an address map. FIG. 4 shows the configuration of address bus and data bus. FIGS. 5 to 15 show the function blocks or modules. FIGS. 16 to 22 are operation flow charts of a data transfer controller. FIGS. 23 and 24 show an operation timing of internal bus. FIG. 25 show an example operation of a block transfer mode. FIGS. 26 to 28 show a block diagram of an essential portion of a printer controller using the single chip microcomputer of this embodiment, as well as the method of its use and an example of operation. FIG. 29 is a block diagram showing an essential portion of a variation of this embodiment of the single chip microcomputer.

FIG. 1 shows the configuration of the single chip microcomputer, a semiconductor integrated circuit device as one embodiment of this invention. The single chip microcomputer 1 may be formed on a semiconductor substrate of, say, a monocrystalline silicon by a semiconductor manufacturing method using a known CMOSFET fabrication process.

The single chip microcomputer 1 may, for instance, be applied to single chip microcomputers that have a data processing device, a data transfer device, a bus control means and a data input/output means, and may include function blocks or modules, such as a central processing unit (data processing device: CPU), a data transfer controller (data transfer device: DTC), a read only memory (third memory means: ROM), a random access memory (first memory means: RAMI), a random access memory (second memory means: RAMP), a timer, a pulse output circuit, a serial communication interface (SCI), an A/D converter (A/D), input/output ports (IOP0–11), an interrupt controller (interrupt control means: IRC), a bus controller (bus control means: BSC), and a clock generator (CGP). The timer consists of two parts, timer A and timer B.

These function blocks are interconnected by internal buses. The internal buses include an address bus, a data bus and a control bus that supplies a read signal, a write signal, a bus size signal and a system clock (these signals not shown). Among the internal address bus are an internal address bus for CPU IAB, an address bus for data transfer DTAB, and an internal address bus for peripheral function module PAB. The internal data bus includes an internal data bus for CPU IDB (first bus) and an internal data bus for peripheral function module PDB (second bus). These buses are interfaced by the bus controller BSC.

The CPU internal buses IAB, IDB are connected to CPU, ROM, RAMI and BSC, with IAB connected to input/output ports IOP0–3 for connection with external address buses and IDB connected to input/output ports IOP4, 5 for connection with external address buses.

The internal buses for peripheral function module PAB, PDB are connected to BSC, RAMP, timer TM, pulse output circuit POC, SCI, A/D converter, interrupt controller IRC, and IOP0–11, with PDB further connected to TDC. DTAB connects DTC and BSC. RAMI is connected to IAB and IDB, whereas RAMP is connected to PAB and PDB.

The CPU and DTC are treated as so-called bus master modules and can use the internal buses. The function blocks including ROM, RAMI, RAMP, timer TM, pulse output circuit POC, SCI, A/D converter, IOP0–11, and interrupt controller IRC are treated as bus slave modules whose internal registers are selectively read and written by the CPU or DTC.

The interrupt controller IRC receives at its input an interrupt signal from the timer TM, SCI, A/D converter and input/output port (IOP11) and outputs an interrupt request signal to the CPU and a start request signal to the DTC. The interrupt controller IRC also receives at its input a clear signal from the DTC and outputs an interrupt clear signal.

The input/output ports IOP0–11 are used for signals on an external bus described later with reference to FIG. 4 and for input/output signals of the input/output circuit, and include a plurality of external terminals used for external bus signals or input/output signals of the single chip microcomputer. The IOP0–3 also serve as address bus output ports, IOP4 and IOP5 double as data bus input/output ports, and IOP6 is also used for a bus control signal. External address and external data are each supplied to IAB and IDB through buffer circuits contained in these input/output ports. PAB and PDB are used for reading and writing data registers in the input/output ports and are not directly associated with the external bus.

Bus control signals output from the single chip microcomputer 1 include an address strobe, a high/low data strobe, a read strobe, a write strobe, and a bus acknowledge signal. Bus control signals entered into the single chip microcomputer 1 include a wait signal and a bus request signal. These input/output signals are not directly related to this invention and therefore not shown. Extension of external bus is enabled by selection of an operation mode of the single chip microcomputer 1 and the functions of these input/output ports are also selected according to the operation mode.

IOP7 is a port also used for the timer input and output. IOP8 is also used for pulse output. IOP9 doubles as a port for SCI input and output. IOP10 also serves as a port for analog input. IOP11 is also used for input of external interrupt request (IRQ). These ports are further used for data input/output signals. Input/output signals that are transferred between IOP7, 9, 10 and the timer TM, SCI and A/D converter are not shown.

In addition, there are external input terminals, which include a power supply terminal Vcc, a ground terminal Vss, an analog power supply terminal AVcc, an analog ground terminal AVss, a reset signal input terminal RES, a standby control signal input terminal STBY, a non-maskable interrupt signal input terminal NMI, an external clock signal input terminal EXTAL, a clock signal input terminal XTAL, and operation mode control signal input terminals MD0, MD1, MD2.

FIG. 2 is a list of exception-handling origins for the single chip microcomputer 1. The exception-handling includes reset, interrupt and trap instructions. The reset and trap instructions are not described here as they are not directly related to this invention.

Interrupt origins include nine external interrupt origins, 10 timer A, B interrupt origins, three SCI origins, and one A/D converter origin. The interrupt origin requests an interrupt to the CPU and also starts the DTC. It is noted, however, that an NMI interrupt, a timer overflow interrupt, an SCI reception error interrupt are exceptional origins that should be processed by software, and therefore make a CPU interrupt request only. The DTC vector addresses for such interrupts are marked with "-".

Among the interrupts that constitute DTC start origins are DTC enable bits provided to DTC enable registers A, B, C, D. When, for example, with a bit 7 of the DTC enable register A (designated as DTEA7) set to "1," an IRQ0 occurs, the IRQ0 is taken as a DTC start origin. Then, when an interrupt origin corresponding to the IRQ0 occurs, the DTC is started. At this time, an interrupt to the CPU is not requested.

The interrupt origins each have their own unique vector addresses as a CPU interrupt origin and a DTC start origin. The vector address of CPU is located at a ROM address after H'00000000 and the vector address for DTC is located at a RAMP address after H'FFFFFC00. Each vector address is represented in hexadecimal number, which is indicated by H'.

The interrupt for each function block is triggered by a set of four origins, and a lacking part in a set of four or eight origins is reserved because the interrupt priority can be set with a set of four origins. This is not directly related to the present invention. The reserved interrupt, however, does not occur in this single chip microcomputer 1.

FIG. 3 shows an address map for the single chip microcomputer 1.

In this single chip microcomputer 1, the CPU address space is 4 G bytes, each byte assigned one unique address. Function blocks each have their own unique address on the CPU address space. The data input/output circuit (data input/output means: I/O) includes addresses of registers for the timer TM, pulse output circuit POC, SCI, A/D converter, input/output ports and interrupt controller of FIG. 1.

The ROM is 32 k bytes in this instance and located in the address from H'00000000 to H'00007FFF. The RAMI is 1 k byte in this instance, ranging from H'FFFFF780 to H'FFFFFB7F. The RAMP is 1 k byte, ranging from H'FFFFFB80 to H'FFFFFF7F. The I/O is located at H'FFFFFF80–H'FFFFFFFF. H' represents a hexadecimal notation. The CPU vector address is located in the ROM area and the DTC vector address is arranged in the RAMP area.

FIG. 4 shows the connection of the internal address bus and internal data bus in the single chip microcomputer 1.

As mentioned above, the I/O includes registers for the timer, pulse output circuit, SCI, A/D converter, input/output ports, and interrupt controller of FIG. 1. Function blocks or modules not connected to bus, such as CPG of FIG. 1, are not shown.

Among the address buses are an IAB to which CPU, ROM and RAMI are connected, a DTAB to which address signals from DTC are supplied, and a PAB to which the RAMP and I/O are connected. These address buses are interfaced by BSC.

Among the data buses are an IDB to which CPU, ROM and RAMI are connected, and a PDB to which DTC, RAMP and I/O are connected. These data buses IDB, PDB are interfaced by BSC. The IDB and the PDB are interconnected through BSC to transfer data between them. The IAB and IDB are connected to the external address bus and the external data bus, respectively, through buffer circuits (BUF), which are included in IOP0–5 shown in FIG. 1.

FIG. 5 through 15 show the configurations and functions of function blocks or modules such as DTC, DTC mode register, interrupt controller and BSC. These are described in the following.

Figure 5:
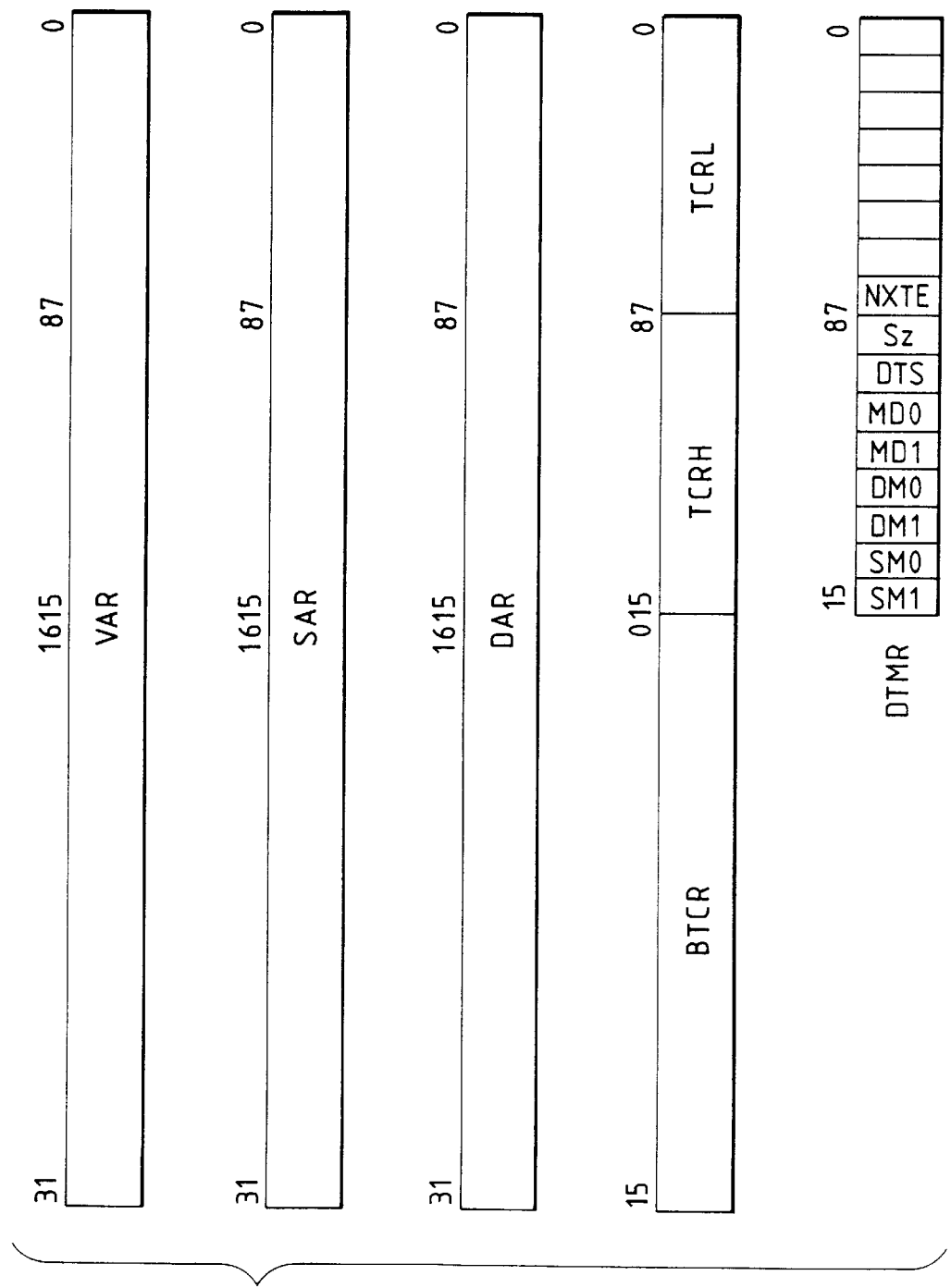
FIG. 5 is a diagram showing the configuration of a register for the data transfer controller (DTC) in this embodiment.

FIG. 5 shows the configuration of registers for DTC.

The DTC registers include a 32-bit vector address register (VAR), a source address register (SAR), a destination register (DAR), a 16-bit block transfer count register (BTCR), a transfer count register (TCR), and a mode register (DTMR). The transfer count register is divided into upper eight bits (TCRH) and lower-eight bits (TCRL).

VAR, SAR and DAR are 32 bits long and can specify a 4G-byte address space. BTCR and TCR are 16 bits long and can specify up to 64 k times of data transfer. The maximum value of BTCR and TCR is H'0000 which is taken as specifying 65,536 times of data transfer.

One set of these registers (VAR, SAR, DAR, BTCR, TCR) is provided in the DTC and, in this instance, does not exist on the CPU address space. Regarding the transfer information to be stored in these registers, the transfer information in the VAR is located at the DTC vector address. As to other registers, a required number of sets of these registers are arranged at addresses on the CPU address space specified by the contents of VAR, for example, at the RAMP. It is also possible to locate them in memory other than the RAMP.

FIG. 6 shows the bit configuration of the DTMR.

Bit 15 and bit 14 of DTMR are SM1 and SM0 bit, respectively, which are control bits used to specify whether to increment, decrement or fix the transfer source address data in the SAR after data transfer. When the SM1 bit is cleared to "0," the transfer source address data in the SAR is fixed. When the SM1 bit is set to "1" and the SM0 bit is cleared to "0," the transfer source address data in the SAR is incremented. When the SM1 bit is set to "1" and the SM0 bit is set to "1," then the transfer source address data in the SAR is decremented.

Bit 13 and bit 12 of DTMR are DM1 and DM0, respectively, which are control bits used to specify whether to increment, decrement or fix the transfer destination address data in the DAR after data transfer. When the DM1 bit is cleared to "0," the transfer destination address data in the DAR is fixed. When the DM1 bit is set to "1" and the DM0 bit is cleared to "0," the transfer destination address data in the DAR is incremented. When the DM1 bit is set to "1" and the DM0 bit is set to "1," then the transfer destination address data in the DAR is decremented.

Bit 11 and bit 10 of DTMR are MD1 and MD0, respectively, which are control bits used to select a data transfer mode. When MD1 and MD0 are cleared to "0," the data transfer mode of the DTC becomes a normal mode. In the normal mode, starting once of the DTC results in data transfer being performed once from an address specified by the SAR to an address specified by the DAR.

After this, according to the specification of SM1, SM0, DM1 and DM0, the address data in SAR and DAR are manipulated and the number-of-transfers data in TCR is decremented. In the normal mode, each time a start origin occurs, the data transfer is repeated a number of times specified by the number-of-transfers data in the TCR. Then, after the data transfer has been done the number of times specified by the number-of-transfers data in the TCR, the DTC transfer operation is disabled and the interrupt that constituted the start origin is requested to CPU.

When DTMR's MD1 bit is cleared to "0" and MD0 bit is set to "1," the operation mode of DTC is set to a repeat mode. In this repeat mode, the starting once of DTC results in data transfer being performed once from an address specified by SAR to an address specified by DAR. The number of transfers is specified by the contents of 8-bit TCRH and TCRL.

After this, according to the specification of SM1, SM0, DM1 and DM0, the address data in SAR and DAR are manipulated and the number-of-transfers data in TCRH is decremented. In the repeat mode, each time a start origin occurs, the data transfer is repeated a number of times specified by the number-of-transfers data in the TCRH. Then, after the data transfer has been performed the number of times specified by the number-of-transfers data in the TCRH, the initial setting values of SAR or DAR and TCRH are recovered according to the contents of the TCRL. This data transfer is repetitively carried out until the CPU disables an interrupt that constitutes the start origin or until the DTC is disabled.

When DTMR's MD1 bit is set to "1" and MD0 bit is cleared to "0," the operation mode of DTC is set to a block transfer mode. In the block transfer mode, the starting once of DTC causes data transfer from an address specified by SAR to an address specified by DAR to be performed two or more times.

After this, the number-of-transfers data in BTCR is decremented. The number of times that data transfer is to be carried out upon starting once of DTC is specified by the contents of the 8-bit TCRH and TCRL. In the block transfer mode, each time a start origin occurs, data transfer is repeated a number of times specified by the number-of-transfers data in BTCR. After data transfer has been performed the number of times specified by the number-of-transfers data in BTCR, the DTC operation is disabled and the interrupt that constituted the start origin is requested to CPU. Setting MD1 and MD0 bit to "1" is taken as a system reservation and is inhibited.

DTMR's bit 9 is a DTS bit, which is a control bit to decide, during the repeat mode or block transfer mode, which of the source side (SAR) and destination side (DAR) is to be made a repeat area or a block area.

DTMR's bit 8 is an Sz bit, which is a control bit to determine whether one data transfer is performed in a byte size (8 bits) or a word size (16 bits). When the Sz bit is cleared to "0," the byte size data transfer is specified; and when the Sz bit is set to "1," the word size data transfer is specified. The word size is two bytes long.

DTMR's bit 7 is an NXTE bit, which is a control bit to determine, in response to one start origin, whether the data transfer should be ended or the next data transfer should be performed. When the NXTE bit is cleared to "0," the register file is read, data-transferred, and written, ending the DTC operation. Detailed description of the register file is given later with reference to FIG. 9.

When the NXTE bit is set to "1," the register file is read, data-transferred and written, and further a read operation is done at the subsequent address in the register file, followed by a specified data transfer and a writing into the register file.

FIG. 7 shows the function of the DTC register.

In the normal mode, SAR is used as a transfer source address specification register, DAR as a transfer destination address specification register, and TCR's 16 bits as a transfer count register. BTCR is not used. The transfer request is accepted until the contents of TCR are 0.

In the repeat mode, SAR is used as a transfer source address specification register, and DAR as a transfer destination address specification register. When at this time the DTS bit is set to "1," the transfer destination address is taken as a repeat area. When the DTS bit is cleared to "0," the transfer source address becomes a repeat area.

TCRH's eight bits are used as a transfer count register and TCRL's eight bits are used as a number-of-transfers register. TCRH and TCRL are set to the same values during the initial setting. When the TCRH becomes "0," the contents of TCRL is transferred to TCRH and the initial set value of SAR or DAR is recovered.

That is, when the DTS bit is set to "1," calculation of SAR+SM1·((−1)^SM0)·2^Sz·TCRL is performed and the initial set value of SAR is reinstated. When the DTS is cleared to "0," calculation of DAR+DM1·((−1)^DM0) ·2^Sz·TCRL is performed and the initial set value of DAR is recovered. BTCR is not used. The transfer request is accepted until the CPU disables interrupts or until the DTC operation is disabled. "^" represents power.

In the block transfer mode, SAR is used as a transfer source address specification register, DAR as a transfer destination address specification register, TCRH's eight bits as a block size count register, TCRL as a block size register, and BTCR as a block transfer count register.

At this time, when the DTS bit is set to "1," the transfer destination is made a block area. When the DTS bit is cleared to "0," the transfer source is made a block area. A single transfer request causes the block transfer to be performed until TCRH is "0." When TCRH is "0," the contents of BTCR are decremented, the contents of TCRL are transferred to TCRH, and the initial set value of SAR or DAR is recovered.

When the DTS bit is set to "1," calculation of SAR+SM1· ((−1)^SM0)·2^Sz·TCRL is performed. When the DTS bit is cleared to "0," calculation of DAR+DM1·((−1)^DM0)·2^Sz TCRL is performed. Transfer requests are accepted until BTCR becomes "0."

The data transfer operations in the repeat mode and block transfer mode are almost similar to those described in the aforementioned "H8/3003 Hardware Manual," published in March 1993 by Hitachi, Ltd. The only difference is that this invention makes the entire region of the address space available for use during the repeat mode by expanding the number of bits of the address specification registers (SAR, DAR).

Figure 8:
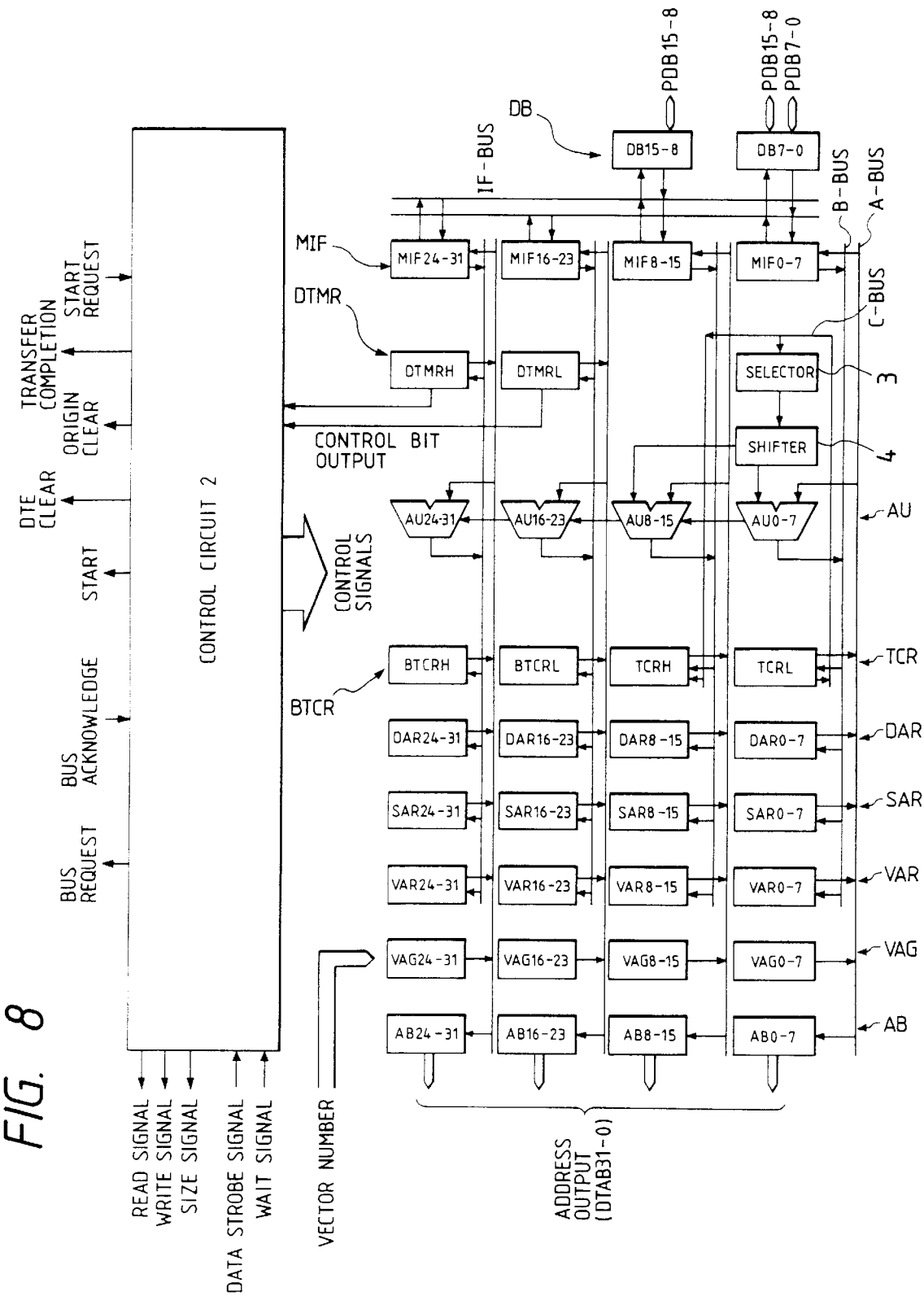
FIG. 8 is a block diagram of the DTC in this embodiment.

FIG. 8 shows the block configuration of the DTC.

The DTC includes such blocks as a control circuit 2, data buffers DB (DB7–0, DB15–8), address buffers AB (AB0–7, AB8–15, AB16–23, AB24–31), bus interfaces MIP (MIF0–7, MIF8–15, MIF16–23, MIF24–31), DTMR (DTMRH, DTMRL), BTCR (BTCRH, BTCRL), TCR (TCRH, TCRL), DAR (DAR0–7, DAR8–15, DAR16–23, DAR24–31), SAR (SAR0–7, SAR8–15, SAR16–23, SAR24–31), VAR (VAR0–7, VAR8–15, VAR16–23, VAR24–31), arithmetic operation circuits AU (AU0–7, AU8–15, AU16–23, AU24–31), a selector 3, a shifter 4, and vector address generators VAG (VAG0–7, VAG8–15, VAG16–23, VAG24–31). These blocks are interconnected by four internal buses—A bus, B bus, C bus and IF bus.

The control circuit 2, when the DTC start request signal output from the interrupt controller IRC becomes active, starts the operation to produce control signals to control the operations of other parts. Further, the control circuit 2 outputs a bus request for using the bus, checks that a bus acknowledge signal from the BSC is active, and performs read/write operations. The control circuit 2 outputs a read signal, a write signal and a size signal, all representing the read/write operations. In response to the bus operation, the control circuit 2 receives a wait signal and a data strobe signal and performs operations accordingly.

The DTC transfer operation is controlled according to the contents held in the DTMR. When a specified operation is finished, a transfer completion signal, an origin clear signal and a DTE clear signal are output to the interrupt controller IRC. In response to the transfer completion signal and a vector number, the interrupt controller IRC outputs an origin clear signal. The interrupt controller IRC in this instance holds the vector number for a period from the activating of the DTC start request to the DTC transfer completion signal becoming active.

The address buffer AB is 32 bits wide to handle the address space of 4G bytes. It receives data from A bus, holds address data used by DTC for reading and writing, and outputs it to DTAB (DTAB31–0).

The data buffer (DB) is 16 bits wide, is connected to PDB (PDB0–7, PDB8–15) and stores data to be read and written by DTC. The data buffer is connected to the internal circuit of DTC via the interface bus (IF bus) and bus interface MIF.

The bus interface MIF is 32 bits wide and provides interface between the DTC's registers and the data buffer DB. Because the data buffer DB is 16 bits wide and the DTC interior is 32 bits wide, the bus interface MIF performs data alignment.

The functions of the registers DTMR, BTCR, TCR, DAR, SAR and VAR are as described above. Each of these registers receives data from B bus and outputs data onto A bus. TCRL further puts data on C bus, and TCRH also receives data from C bus.

The arithmetic operation circuit AU performs addition and subtraction. A lower unit of the arithmetic operation circuit AU (AU0–7, AU8–15) has its one input connected to A bus and other input connected to the output of the shifter 4. An upper unit of the arithmetic operation circuit (AU16–23, AU24–31) has its one input connected to A bus and the other input is regarded as receiving a "0" output. The output of each unit is placed on B bus as the result of calculation.

The shifter 4 receives an output from the selector 3 and permits a 1-bit shift toward left (to higher order). This 1-bit shift is identical to a x2 processing and is performed to allow the word-size transfer.

The selector 3 receives the contents of C bus and selects between the input and a constant value (1) not shown. The +2 calculation is done by the selector 3 outputting "1," the shifter 3 performing the x2 operation on the selector output, and AU adding the result with the contents of A bus.

In the repeat mode and the block transfer mode, when TCRH becomes H'00, the content of TCRL is output to C bus and transferred to TCRH and at the same time sent to the shifter via the selector. When the Sz bit is set to "1," the shift operation is performed. When the Sz bit is cleared to "0," the data is input as is to the arithmetic operation circuit AU. This value is expressed as (2^Sz)·TCRL.

On the other hand, the arithmetic operation circuit AU is supplied the content of SAR or DAR via A bus. When the DTS bit is cleared to "0," the DAR is selected. When the DTS bit is set to "1," the SAR is selected. The arithmetic operation circuit AU either performs addition or subtraction or outputs the content of A bus.

The operation performed by the AU depends on the content of SM1 and SM0 bits or DM1 and DM0 bits. When the DTS bit is cleared to "0," DM1 and DM0 bit are selected. When the DTS bit is set to "1," SM1 and SM0 bit are selected.

When SM1 or DM1 bit is cleared to "0," the operation of the arithmetic operation circuit AU is the outputting of the content of A bus. When SM1 bit is set to "1" and SM0 bit is cleared to "0," or when DM1 bit is set to "1" and DM0 bit is cleared to "0" (the increment is specified), the operation of the arithmetic operation circuit AU is a subtraction.

When both SM1 and SM0 bits are set to "1," or when both DM1 and DM0 bits are set to "1" (the decrement is specified), the arithmetic operation circuit AU performs an addition. This operation is represented as −DM1·((−1)^DM0) when the DTS bit is cleared to "0." When the DTS bit is "1," it is expressed as −SM1·((−1)^SM0).

In other words, when the DTS bit is cleared to "0," the calculation of DAR−DM1·((−1)^DM0)·(2^Sz)·TCRL is performed. When the DTS bit is set to "1," SAR−SM1·((−1)^SM0)·(2^Sz)·TCRL is calculated.

The vector address generator VAG receives the vector number from the interrupt controller IRC to generate a vector address of DTC. The upper 24 bits of the vector address is set to H'FFFFFC. The lower eight bits of the vector address is set with the vector number shifted left (to higher order) by two bits. The two bits of lowest order are fixed to "0."

Figure 9:
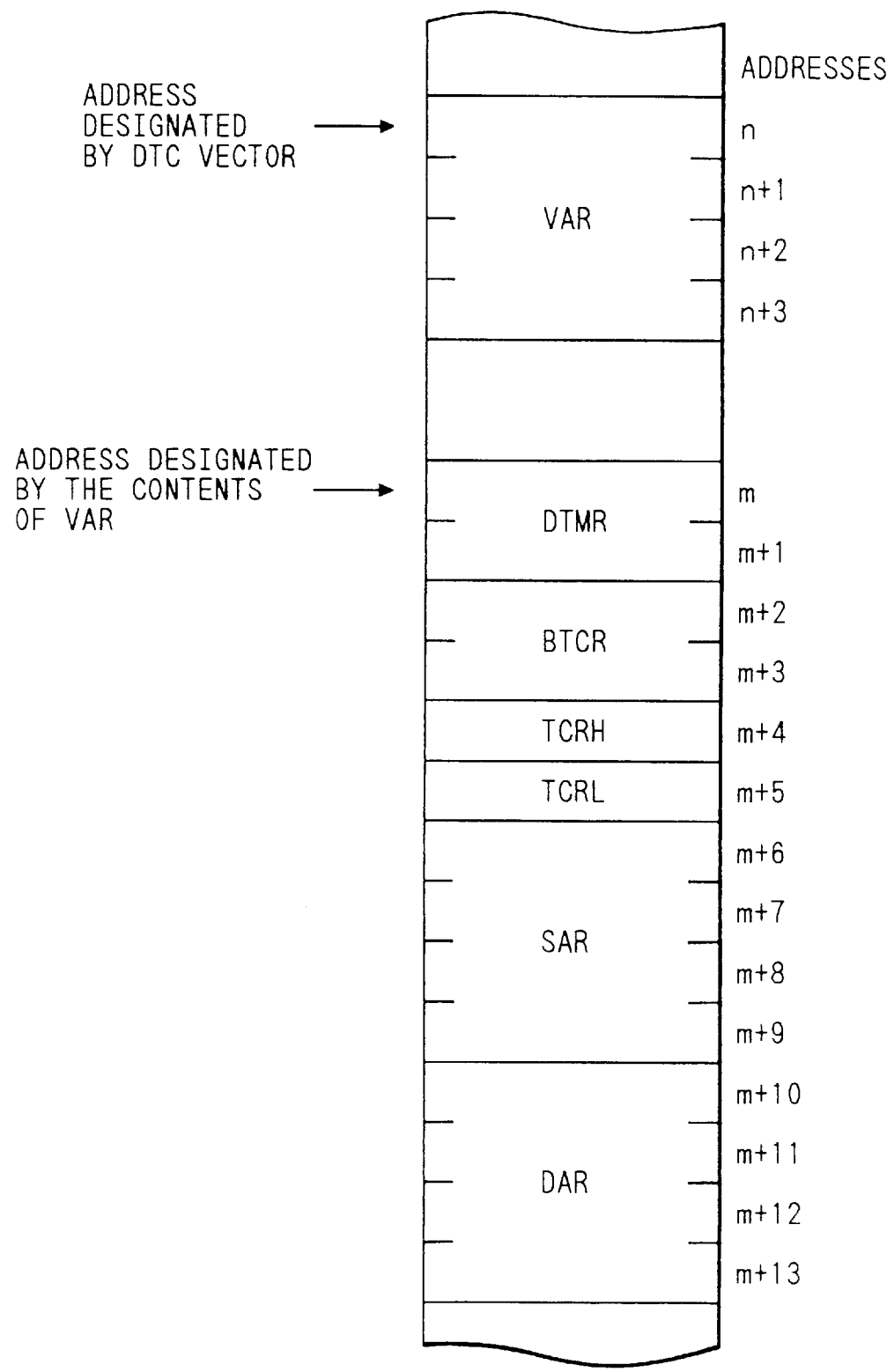
FIG. 9 is a diagram showing the on-memory configuration of the DTC register in this embodiment.

FIG. 9 shows the data configuration on memory (RAMP) for one set of the DTC registers. One set of the DTC registers on the memory (RAMP) is regarded as one set of register file.

The contents of the vector address register (VAR) are stored in a unique DTC vector address for each start origin. The contents (m) of the vector address register (VAR) represent the start addresses of memory areas where the contents to be stored in the mode register (DTMR), the contents to be stored in the source address register (SAR), the contents to be stored in the destination register (DAR), the contents to be stored in the block transfer count register (BTCR), and the contents to be stored in the transfer count register (TCR) reside. The address regions in which these registers contents are stored are a continuous region ranging from m to m+13. These contents are transfer information (transfer parameters) to be stored in respective registers.

When, for example, the DTC is started, the contents of VAR are read out from the DTC vector address unique to that start origin. Next, while incrementing the contents (m) of VAR, the contents to be stored in the registers DTMR to DAR are successively read out and written into the corresponding registers. When this read-out operation is finished, the VAR in the DTC holds the initial value (m).

When, after data transfer, the contents of the registers in the DTC (except for VAR) are to be written back into the corresponding address regions on the RAMP memory, the contents (m) held in VAR in the DTC are incremented and at the same time the contents of registers DTMR to DAR are successively written into the original addresses (m to m+13). When this writing operation is finished, the VAR in the DTC holds an address (m+14) next to the last address (m+13). Because each register is 16 bits wide and the internal bus is 16 bits wide, the increment performed is +2.

When the NXTE bit of the DTMR is set to "1," the next data transfer is performed for the same start origin after one transfer has been completed. The contents of the registers used for this next data transfer are located at address regions (address m+14 to m+27) contiguous to the previous address region (m to m+13) where the above-mentioned register contents are stored, in the same order of DTMR, BTCR, TCR, SAR and DAR as in the previous data transfer.

When the NXTE bit of the second DTMR is set to "1," a further set of registers is arranged. The similar process is repeated until the NXTE bit of the DTMR cleared to "0" is encountered.

One set of register file (address regions holding the contents of registers DTMR to DAR) requires 14 bytes of capacity, as shown in FIG. 9. If this register file is designated by a fixed vector address without using VAR, 14 bytes of memory are left unused at a vector address that does not use the DTC. Or, it is difficult to assign two or more register files to a single start origin.

If two sets of register file are assigned to each of all start origins, a memory address region for one set of register file is left unused because many of the start origins require only one set of register file. For the start origins that are not used, memory addresses for two sets of register file are left idle. It is considered extremely difficult to utilize these scattered, unused memory address regions for other purposes. Further, this memory arrangement cannot be applied for varying number of register file sets, resulting in restrictions in memory use, lowering the degree of freedom of system configuration.

Because this invention designates each register file by the contents of VAR, it is possible to locate a register file at an arbitrary address, improving the utilization of the memory address region. It is also possible to allocate an arbitrary number of register file sets to any one start origin and to perform data transfer. A start origin that is not used, if any, leaves only 4 bytes of VAR unused. Hence, the memory can be used in a variety of ways, improving the utilization of memory. Although an additional procedure to read out the contents of VAR is required, this register file arrangement allows the CPU operation not to be stopped, avoiding a reduction in the CPU processing efficiency.

FIG. 10 shows the configuration of a DTC enable register DTER.

The DTC enable register DTER consists of four registers DTERA, DTERB, DTERC and DTERD and is included in the interrupt controller IRC. The DTC enable register DTER, when an interrupt origin occurs, decides whether it requests an interrupt to CPU or a start to DTC. The DTC enable register DTER is provided with control bits, one for each interrupt origin. The correspondence between these control bits and the interrupt origins is shown in FIG. 2. Bits not shown in FIG. 2 (DTEB1, DTEB0, DTEC5, DTEC4, DTEC1, DTEC0, DTED6, DTED5, DTED4, DTED3, DTED2, DTED1, DTED0 bits) are reserved bits.

When all bits of the DTC enable register DTER are cleared to "0" by resetting and a desired bit is set to "1" by the CPU write operation, the DTC transfer action is enabled. After the DTC transfer is finished, the corresponding DTC enable bit is cleared to "0." The reserved bits hold "0" in this instance and the CPU or DTC is inhibited from writing "1" into them.

Figure 11:
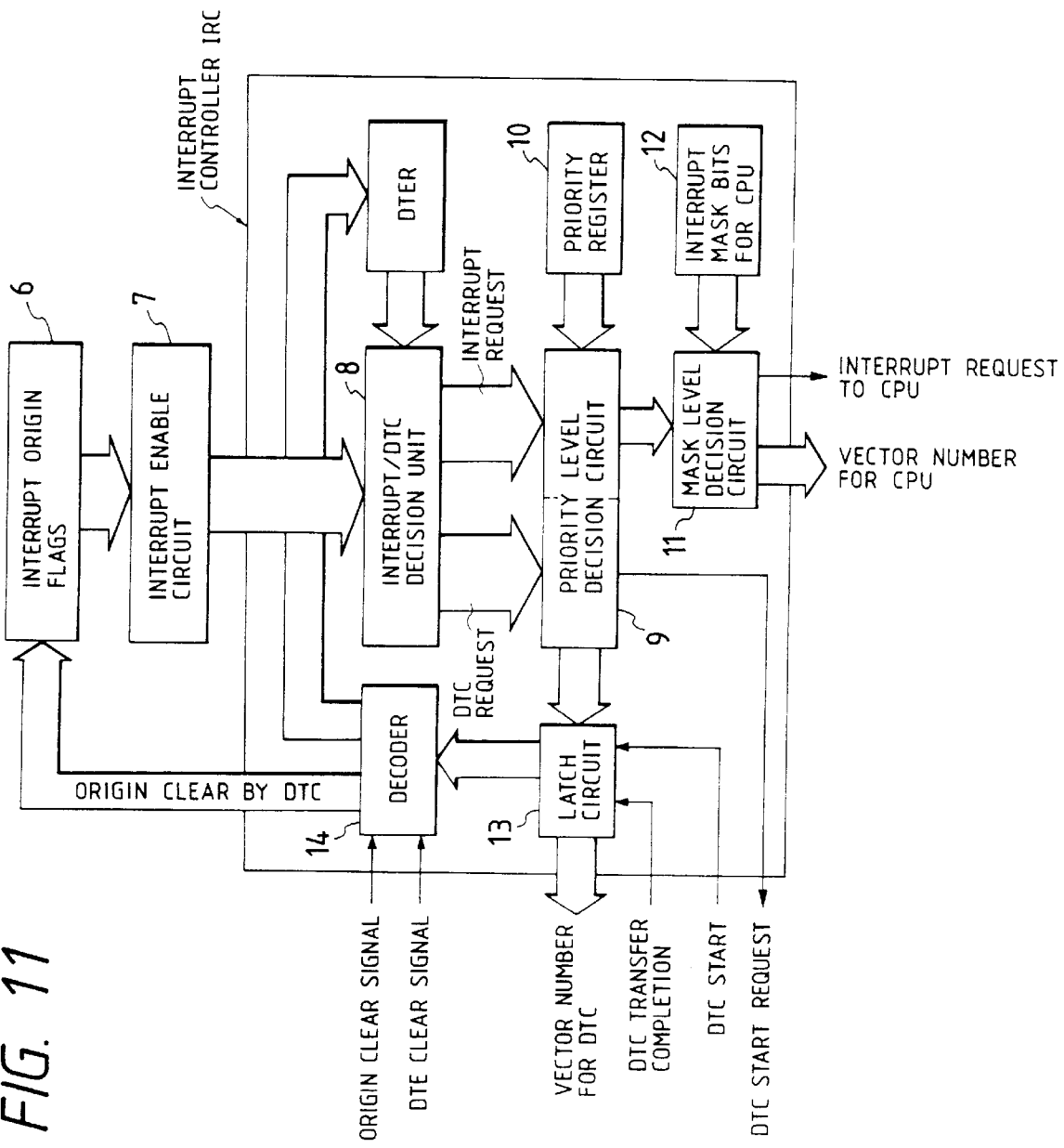
FIG. 11 is a block diagram of an interrupt controller in this embodiment.

FIG. 11 shows the outline block diagram of the interrupt controller IRC.

There are two kinds of interrupt origin—an internal interrupt and an external interrupt, which are provided with an internal interrupt origin flag 6 and an external interrupt origin flag 6, respectively. The internal interrupt origin flag 6 is set to "1" when the input/output circuit for timer, SCI, and A/D converter enters a specified state.

The external interrupt origin flag 6 is set to "1" when an external interrupt input terminal reaches a specified level or when a specified signal change occurs. The interrupt origin flag 6 is cleared to "0" either by the CPU write operation or when the DTC transfer operation is completed.

Each bit of the interrupt origin flag 6 is entered into the interrupt enable circuit 7, which is also supplied the contents of the interrupt enable register, i.e., an interrupt enable bit. The interrupt enable register is a register that can be read and written from the CPU and chooses to permit or inhibit an interrupt corresponding to the flag.

For example, when the interrupt origin flag 6 for a specified interrupt is set to "1" and the interrupt enable bit is set to "1," the corresponding interrupt is requested. That is, the interrupt enable circuit 7 is formed as a logic circuit receiving an interrupt origin flag 6 and a corresponding interrupt enable bit as inputs.

The output of the interrupt enable circuit 7 is supplied to an interrupt/DTC decision unit 8, which is also supplied the contents of the DTC enable register DTCE, which, when an interrupt is requested, decides whether to start the DTC or enable an interrupt to the CPU.

When, for instance, the bit of the DTC enable register DTCE is set to "1," the start of DTC is requested and no interrupt request to CPU is made. When the bit of the DTC enable register DTCE is cleared to "0," an interrupt to CPU is requested and a DTC start request is not made.

That is, the interrupt/DTC decision unit 8 is made up of a logic circuit of an interrupt signal and a DTC enable bit and a logic circuit of an interrupt signal and an inverted signal of the DTC enable bit. The output of the former logic circuit forms a DTC start request signal and the output of the latter logic circuit forms a CPU interrupt request signal.

The outputs of the interrupt/DTC decision unit 8—a CPU interrupt request and a DTC start request—are entered independently into a priority level decision circuit 9, which is further supplied an output from the priority register 10. The priority register 10 sets a priority, for example, two-level priority, for each group of interrupt origins.

The priority level decision circuit 9 decides the priority level of each of the CPU interrupt request and the DTC start request. It selects a request with a highest priority, generates a vector number, and outputs the CPU interrupt request signal and the DTC start request signal together with their vector numbers.

The CPU interrupt request signal and the vector number are sent to a mask level decision circuit 11, which is also supplied CPU interrupt mask bits 12. If the requested interrupt is lower than the CPU interrupt mask level, it is halted.

When the interrupt-request-to-CPU signal becomes active, the CPU, after completing the instruction being executed, starts an interrupt exception handling to retrieve a branch destination address from the vector address corresponding to the vector number so that the CPU data processing program branches to an interrupt routine.

Such priority level decision and interrupt mask level are already introduced in the "H8/3003 Hardware Manual," published in March 1993 by Hitachi, Ltd. and thus detailed description is omitted here.

The DTC start request is fed to the DTC and the DTC vector number is fed to a latch circuit 13. The DTC start signal and DTC transfer completion signal are output from the DTC to the latch circuit 13. When the DTC starts its operation, the DTC start signal becomes active and is latched by the latch circuit 13. Then, the DTC data transfer is finished, the DTC transfer completion signal is activated, and the latch of the latch circuit 13 is released. Thus, during the DTC operation, the DTC vector number is held in the latch circuit 13.

The DTC vector number and the DTC transfer completion signal are also sent to a decoder 14. An origin clear signal for the corresponding interrupt origin flag 6 becomes active, clearing the origin flag or DTE bit. The interrupt origin flag 6, interrupt enable bit, and interrupt enable circuit 7 are, in this instance, incorporated in each input/output circuit. They may be built into the interrupt controller.

Figure 12:
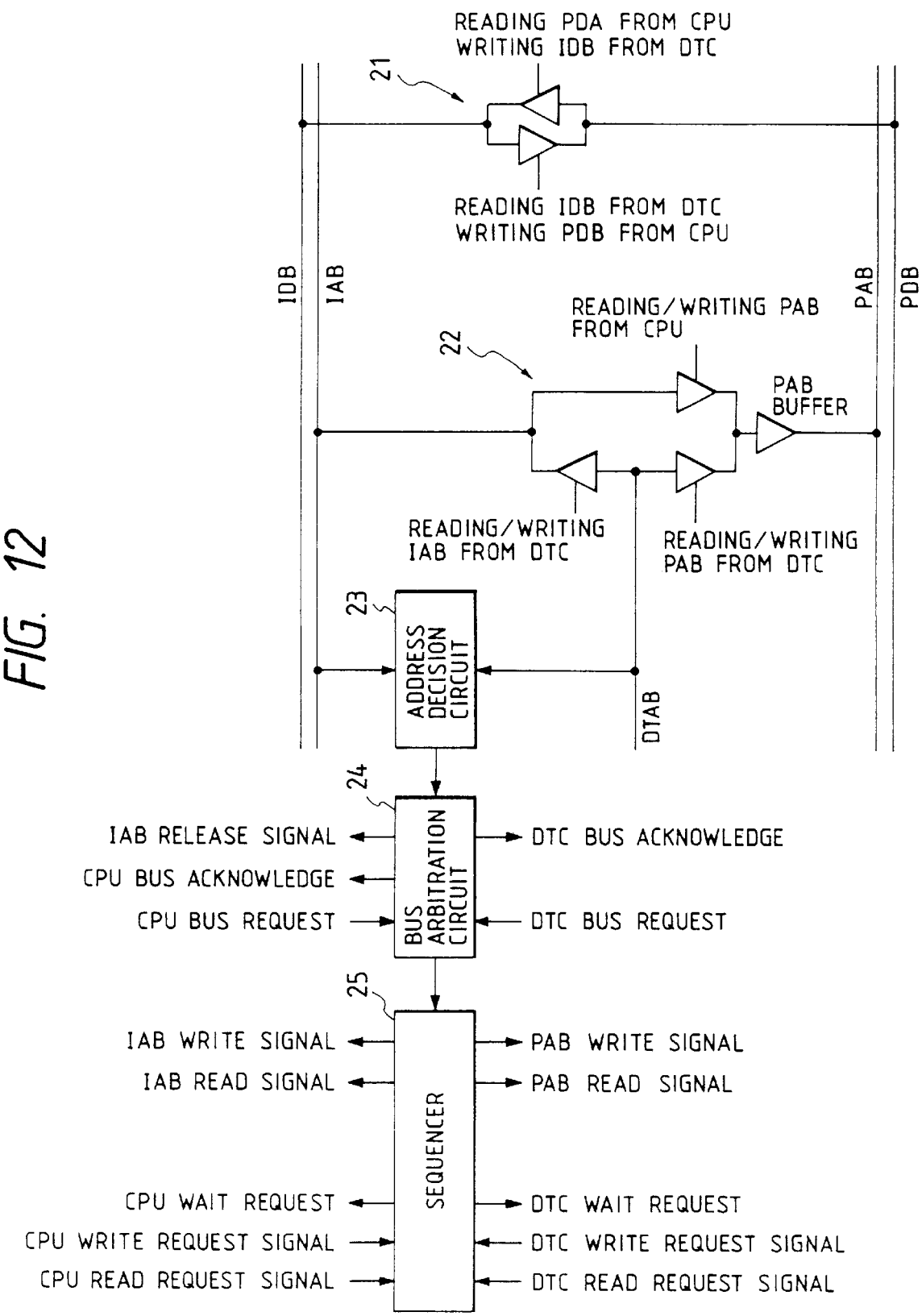
FIG. 12 is a block diagram of a bus controller in this embodiment.

FIG. 12 shows the outline block of the bus controller BSC.

The BSC consists of a data bus buffer circuit 21, an address bus buffer circuit 22, and address decision circuit 23, a bus arbitration circuit 24, and a sequencer 25. The control of the data bus buffer circuit 21 and the address bus buffer circuit 22 is performed by the sequencer 25.

The CPU outputs a CPU bus request signal to the bus arbitration circuit 24, feeds a CPU read request signal and a CPU write request signal to the sequencer 15, and outputs an address signal to IAB. On the other hand, the CPU receives a CPU bus acknowledge signal from the bus arbitration circuit 24, a CPU wait request signal from the sequencer 25, and an IAB release signal from the bus arbitration circuit 24.

Similarly, the DTC outputs a DTC bus request signal to the bus arbitration circuit 24, a DTC read request signal and a DTC write request signal to the sequencer 25, and an address signal to DTAB. On the other hand, the DTC receives a DTC bus acknowledge signal from the bus arbitration circuit 24 and a DTC wait signal from the sequencer 25. The DTC also produces a CPU or DTC data strobe signal or a data buffer control signal.

When one of the CPU and the DTC requests the use of bus, the bus arbitration circuit 24 outputs an active bus acknowledge signal to the CPU or DTC that has made the request, and gives it the right to use the bus. When both the CPU and the DTC make bus requests, an address check and a bus arbitration are performed using the bus arbitration circuit 24 and the address decision circuit 23. That is, the address signal that the CPU has output to IAB and the address signal that the DTC has output to DTAB are entered into the address decision circuit 23.

When the CPU reads/writes the memory or register (IDB side) connected to ROM, RAMI and external IDB and when the DTC reads/writes the memory or register (PDB side) connected to RAMP and PDB of I/O, the right to use the bus is given to both the CPU and the DTC.

When the CPU reads/writes the memory or register (PDB side) connected to RAMP and PDB of I/O or when the DTC reads/writes the memory or register (IDB side) connected to ROM, RAMI and external IDB, the bus arbitration circuit 24 arbitrates the bus use.

At a point when bus cycles on both the IDB and PDB sides are completed, the bus arbitration circuit 24 gives the right to use the bus to either CPU or DTC. Here, because the DTC has a priority for bus use over the CPU, the right to use the bus is given to the DTC if it has made a bus request.

For example, if, while the DTC is reading/writing the PDB side, the CPU requests to read/write the PDB side, the bus arbitration is halted until the DTC finishes the read/write operation. Further, since the DTC has a priority over the CPU, the CPU is kept waiting until the DTC relinquishes the bus use.

Once the right of bus use is given, the read or write bus cycle is started on one or both of IDB and PDB sides.

For example, when the CPU is reading/writing the IDB side and the DTC is reading/writing the PDB side, the data bus buffer circuit 21 is open, rendering IDB and PDB data independent of each other. The address bus buffer circuit 22 outputs the contents of DTAB to PAB.

When the CPU is reading the PDB side, the PDB-to-IDB data buffer is turned on and the address buffer circuit 22 outputs the contents of IAB to PAB.

When the CPU is writing the PDB side, the IDB-to-PDB data buffer is turned on and the address buffer circuit 22 outputs the contents of IAB to PAB.

Further, when the DTC is reading the IDB side, the IDB-to-PDB data buffer is turned on and the address buffer circuit 22 outputs the contents of DTAB to IAB. At the same time, the CPU is given an IAB open signal, rendering the IAB output of CPU open.

When, on the other hand, the DTC is writing the IDB side, the PDB-to-IDB data buffer is turned on and the address buffer circuit 22 outputs the contents of DTAB to IAB. The CPU, as in the previous case, is given an IAB open signal, opening the IAB output of CPU.

Figure 13:
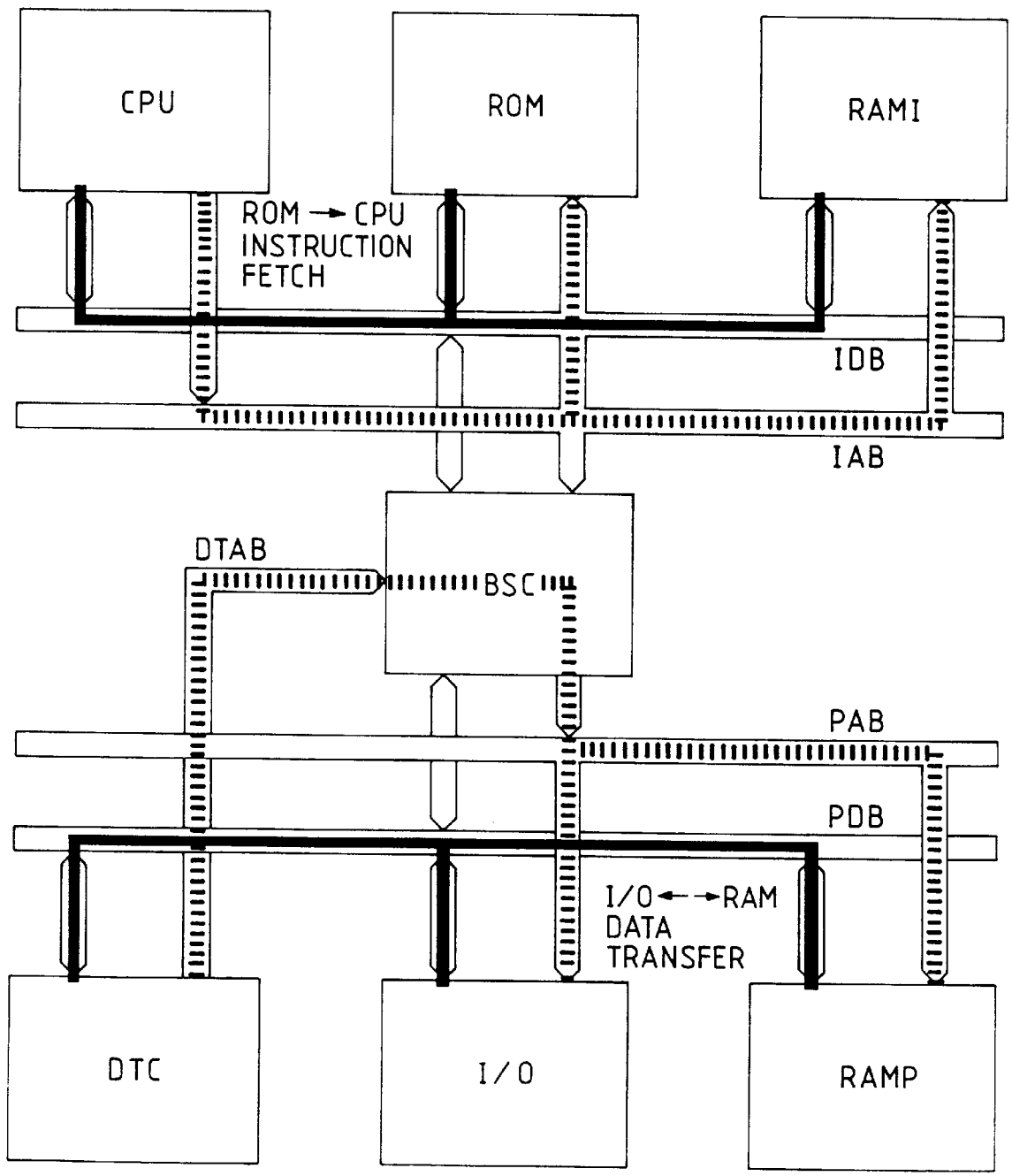
FIG. 13 is an explanatory diagram showing a first state of the bus operation in this embodiment.

FIG. 13 shows a first state of the bus operation.

When the CPU reads a program from ROM or reads/writes data to and from RAMI, the read/write operation is done by using IAB and IDB. The CPU, as shown in FIG. 4, is able to read and write the external bus through the buffer circuit BUP. In this case, the CPU does not use PAB and PDB.

At this time, the read/write of RAMP by the DTC and the data transfer between RAMP and I/O are performed by using DTAB, PAB and PDB. The contents of DTAB are put out on PAB; PDB and IDB are isolated from each other; and the DTC does not use IAB and IDB. That is, the DTC can perform data transfer without stopping the CPU operation.

When the CPU is reading/writing ROM, RAMI or the external bus and the DTC is reading/writing RAMP or I/O, the CPU and the DTC can operate parallelly.

Figure 14:
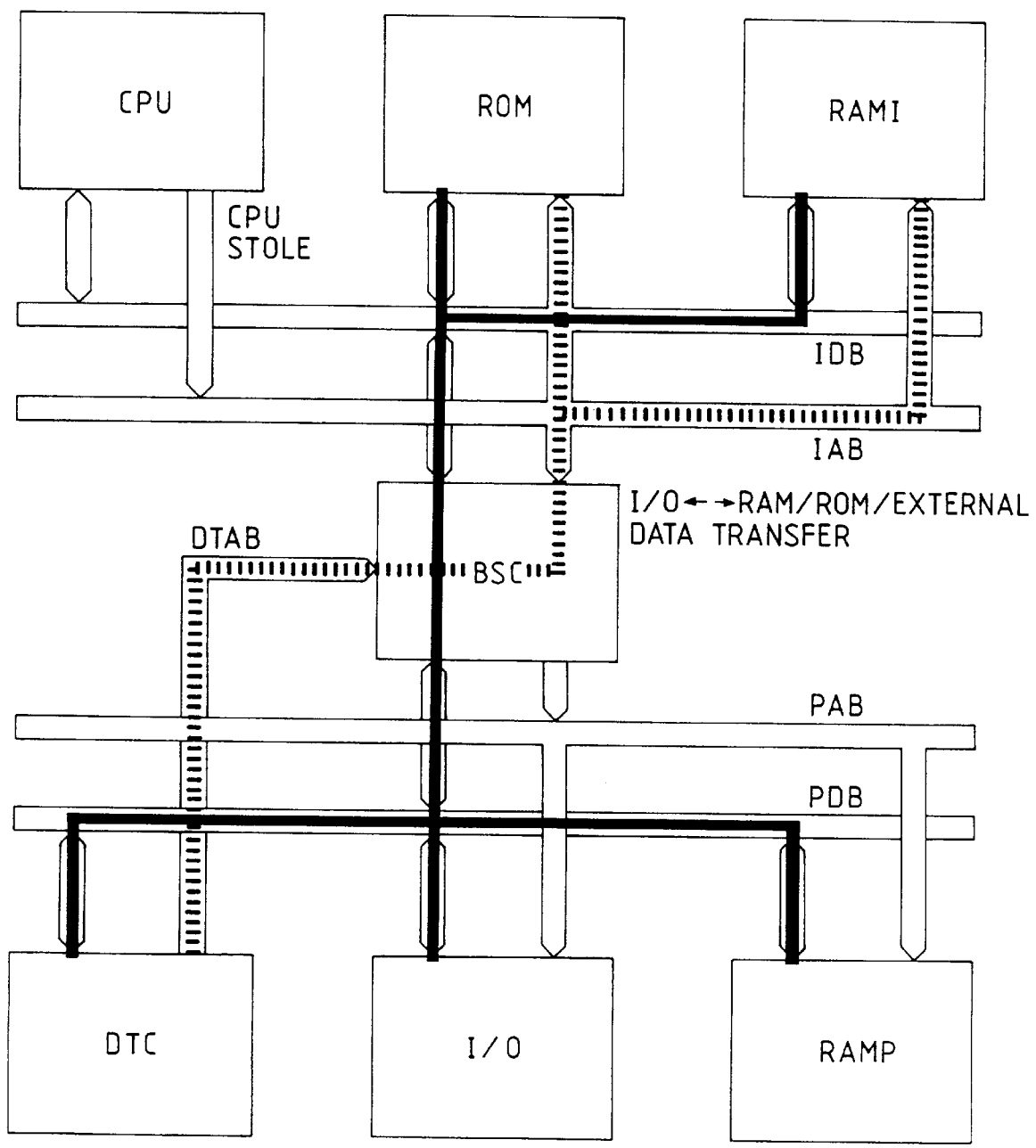
FIG. 14 is an explanatory diagram showing a second state of the bus operation in this embodiment.

FIG. 14 shows a second state of the bus operation.

When the CPU reads a program from ROM or reads/writes data to and from RAMI and when the DTC reads/writes ROM or RAMI or performs data transfer, a bus arbitration is performed as described above.

A bus request from the DTC is give a priority over a bus request from the CPU. The bus arbitration is performed by BSC according to the address designated by DTAB. When the DTC attempts to read/write ROM or RAMI by using IAB and IDB, the bus arbitration circuit 24, upon completion of bus access by CPU, brings the bus acknowledge signal inactive and makes an IAB open signal active.

Then, the contents of DTAB are output to IAB, and IDB and PDB are connected. This allows the DTC to read/write ROM or RAMI. In this case, however, the CPU is stopped.

Figure 15:
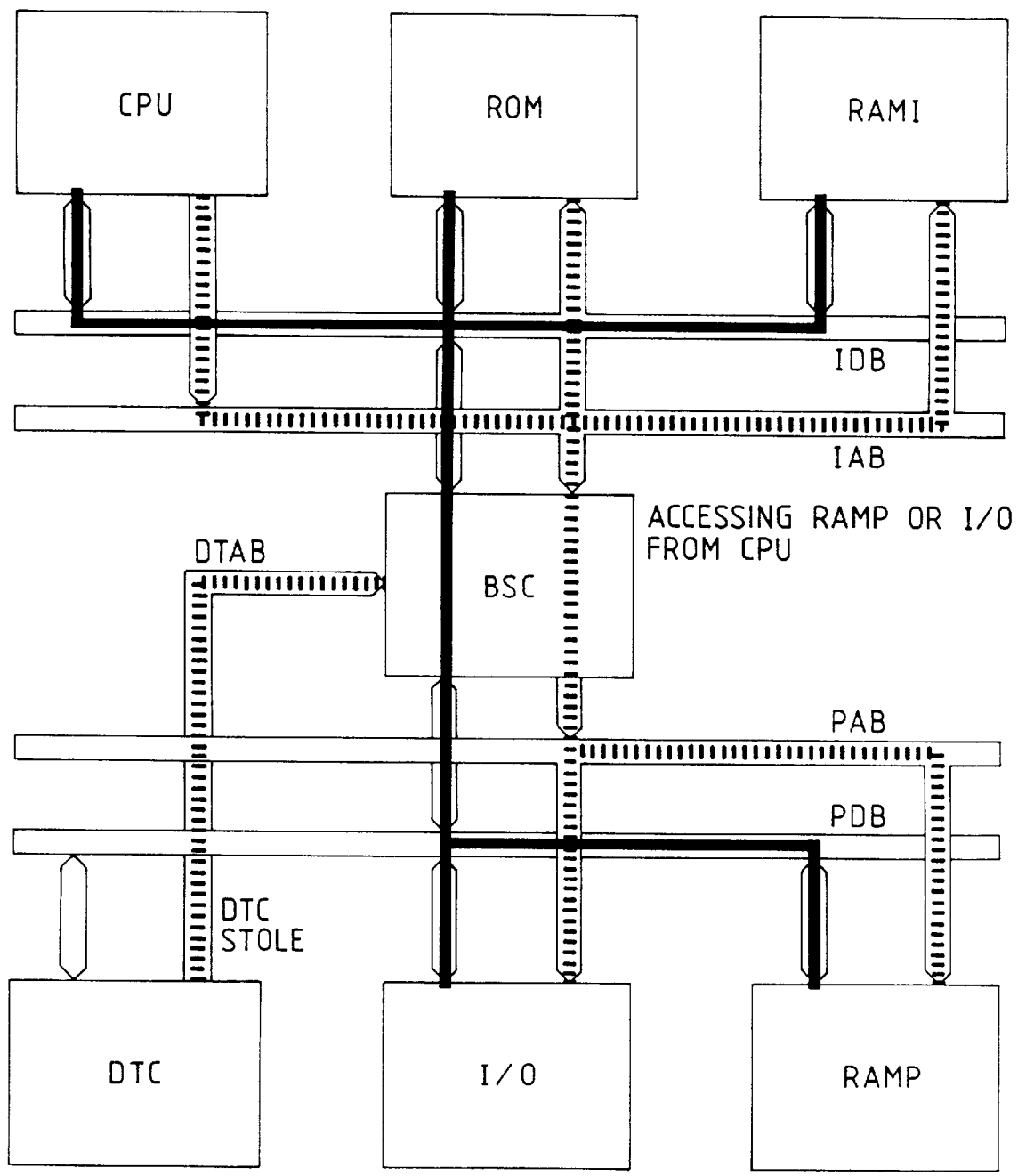
FIG. 15 is an explanatory diagram showing a third state of the bus operation in this embodiment.

FIG. 15 shows a third state of the bus operation.

When the CPU reads/writes RAMP and I/O, a bus arbitration is also performed. As mentioned above, because the bus request made by the DTC is given priority over one made by the CPU, it is only when the DTC is not using the bus that the CPU can read/write RAMP and I/O.

If the DTC makes a bus request while the CPU is reading/writing RAMP and I/O, the DTC is kept standing by until the CPU finishes the bus use. When on the other hand the CPU reads/writes RAMP and I/O, the contents of IAB are placed on PAB, and IDB and PDB are connected.

Figure 16:
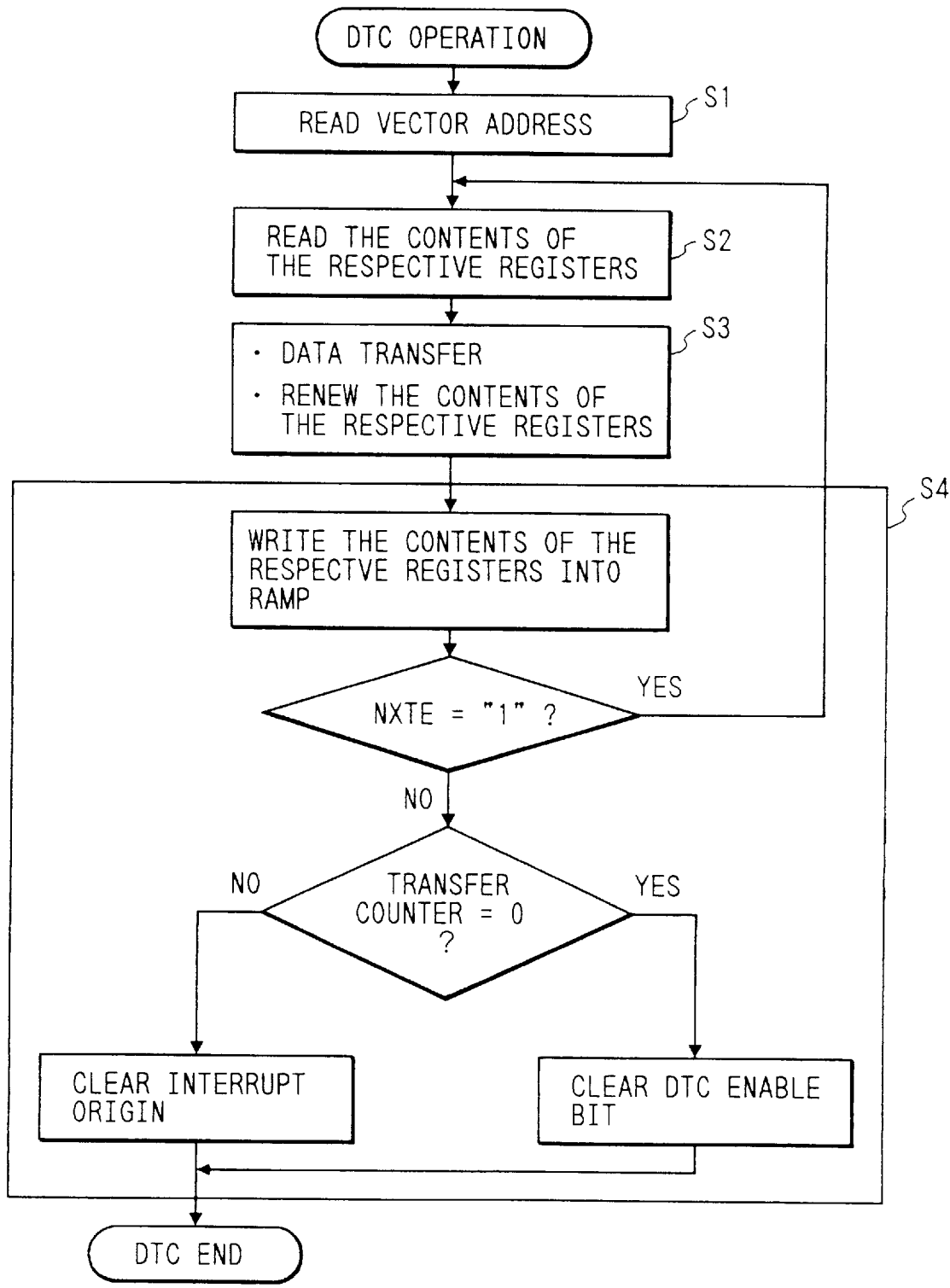
FIG. 16 is an operation flow chart of the DTC in this embodiment.

Next, regarding the action of this embodiment, the outline of TDC operation flow is described by referring to FIG. 16.

First, the CPU writes beforehand the start address (m) of a register file into a DTC vector address on RAMP and from this address (m) on RAMP writes an initial value of the register file. Then, the CPU sets the interrupt origin enable bit to "1" and the DTC enable bit to "1."

When, with the DTC enable bit set to "1," a specified interrupt request occurs and the DTC is started, the DTC at step 1 (S1) reads the contents of the vector address register (VAR) from the vector address corresponding to the start origin, and stores the VAR contents in a specified register in the DTC. After this read operation is done, the DTC enters a one-state wait or internal processing state.

At step 2 (S2), the DTC successively reads from the addresses designated by the vector address register the contents of mode register (DTMR), the contents of block transfer count register (BTCR), the contents of transfer count register (TCR), the contents of source address register (SAR) and the contents of destination register (DAR), and stores them in specified registers in the DTC. After this read operation, the DTC enters one-state wait or internal processing state as mentioned in the previous step.

At step 3 (S3), the DTC performs data transfer according to the contents of each register thus read and renews the contents of each register. For example, in the normal mode and the repeat mode, one data transfer is carried out. In the block transfer mode, data transfer is performed the number of times specified by TCRH and TCRL. Then, after data transfer, the DTC enters the one-state wait or internal processing state, as mentioned above.

At step 4 (S4), the DTC stores the contents of each register into the original address on RAMP. At this time, when the NXTE bit is set to "1," the DTC returns to step 1 (S1) where it successively reads the contents of DTMR, BTCR, TCR, SAR and DAR from contiguous addresses and repeats the data transfer operation.

When on the other hand the NXTE bit is cleared to "0," the DTC operation is stopped. Then, if the contents of transfer counter is not "0," the DTC makes the origin clear signal active and clears the interrupt origin flag 6 to "0" through the interrupt controller IRC.

When the transfer counter is "0," the DTC enable bit is cleared. The transfer counter uses TCR during the normal mode, TCRH during the repeat mode, and BTCR during the block transfer mode.

After the DTC has stopped, because the DTC enable bit is cleared and the interrupt origin is held, the CPU interrupt exception handling is performed to execute the interrupt routine. In this CPU interrupt routine, the interrupt origin flag 6 must be cleared.

The CPU also can learn that the DTC's transfer operation has finished, by reading a register on the RAMP, especially BTCR or TCR, and checking that the content is "0."

When the CPU attempts to read/write the PDB side during the DTC operation, the CPU is held waiting temporarily. As mentioned above, because the DTC relinquishes the bus use at halting points between the operation steps, the CPU can be prevented from being stopped for a long period. Except when the CPU attempts to read/write the PDB side continuously, the CPU can operate at the halting points between the DTC operation steps.

To make an efficient use of such a parallel operation, the DTC's data transfer should preferably be performed between RAMP and I/O. It is also desirable to locate the CPU instructions on ROM and the work area on RAMI.

Further, because in the CPU bus cycle the reading of instructions has higher frequency of occurrence than the reading/writing of data, it is possible to lower the frequency of CPU's reading/writing of RAMP and I/O—including the processing of data accumulated in RAMP which is performed after the DTC's transfer operation—and minimize a reduction in the processing speed, making the processing speed almost equal to the one during the CPU/DTC parallel operation, if the initial setting of DTC and I/O by the CPU is excluded. In this way, it is possible to improve the processing speed over the one of the conventional devices.

Figure 17:
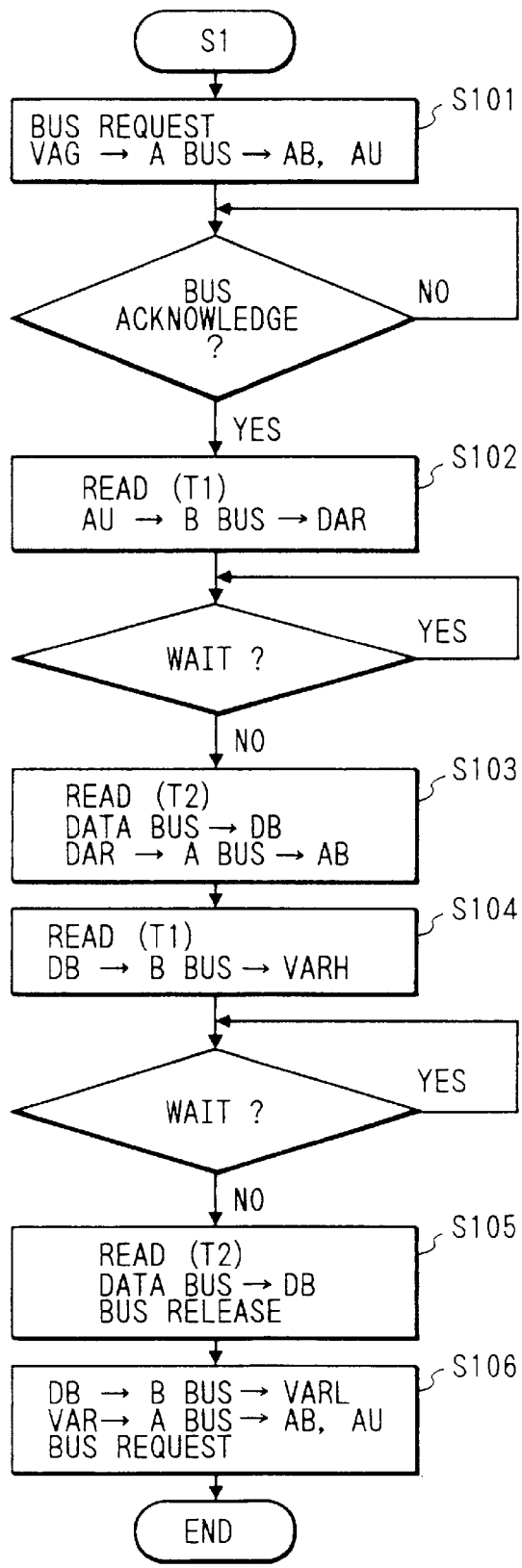
FIG. 17 is an operation flow chart of the DTC in this embodiment at step 1 of FIG. 16.

Now, by referring to FIG. 17, the operation flow of step 1 in FIG. 16 is explained in detail.

In the step 1 (S1), a step 101 (S101) activates the bus request signal to request the use of bus.

Then, according to the vector number output from the interrupt controller IRC, the vector address generator (VAG) generates a vector address corresponding to the start origin. The generated vector address is fed through the A bus to the address buffer (AB), from which it is output to DTAB. The contents of the A bus are taken into the AU which performs an increment (+2).

Further, the DTC references the bus acknowledge signal to check if the right to use the bus is acquired. When the result of this decision is "NO," the DTC is kept waiting until the bus use is permitted. At the same time, the DTC wait signal is activated to indicate that the DTC is standing by.

When the bus acknowledge signal becomes active and the DTC wait signal is deactivated, a step 102 (S102) initiates a read cycle and at the same time the incremented contents are stored in DAR via the B bus.

At this point, because there is no valid data in DAR, the DAR is used as a temporary work area. If in this read cycle, a wait is demanded, the DTC is held standing by until the wait is reset.

At step 103 (S103) the read cycle is completed and the contents of the data bus are taken into the data buffer (DB).

The contents of DTC vector address+2 stored in DAR are sent via A bus to the address buffer (AB) and also output to DTAB.

At step 104 (S104) a read cycle is started and the contents of DB are sent via B bus to the upper 16 bits (VARH) of VAR. In this read cycle, if a wait is demanded, the DTC is made to wait until the wait is canceled.

At step 105 (S105) the read cycle is ended, the contents of the data bus are taken into the data buffer (DB), and the bus request signal is deactivated to release the bus.

At step 106 (S106) the contents of DB are stored in the lower 16 bits (VARL) of VAR via B bus. Then, for the reading of the next register file, a bus is requested. At the same time, the contents (m) of VAR are fed into the address buffer (AB) via A bus and output to DTAB.

Then, the contents of A bus are taken into AU, which increments the contents of A bus (+2). At this time, the input from B bus to DB in synchronism with φ is performed prior to the output from DB to A bus in synchronism with φ#. φ# is an inverted signal of φ.

Data transfer from the data buffer (DB) to B bus is performed through the IF bus and bus interface (MIF). Description of this operation is omitted here.

Figure 18:
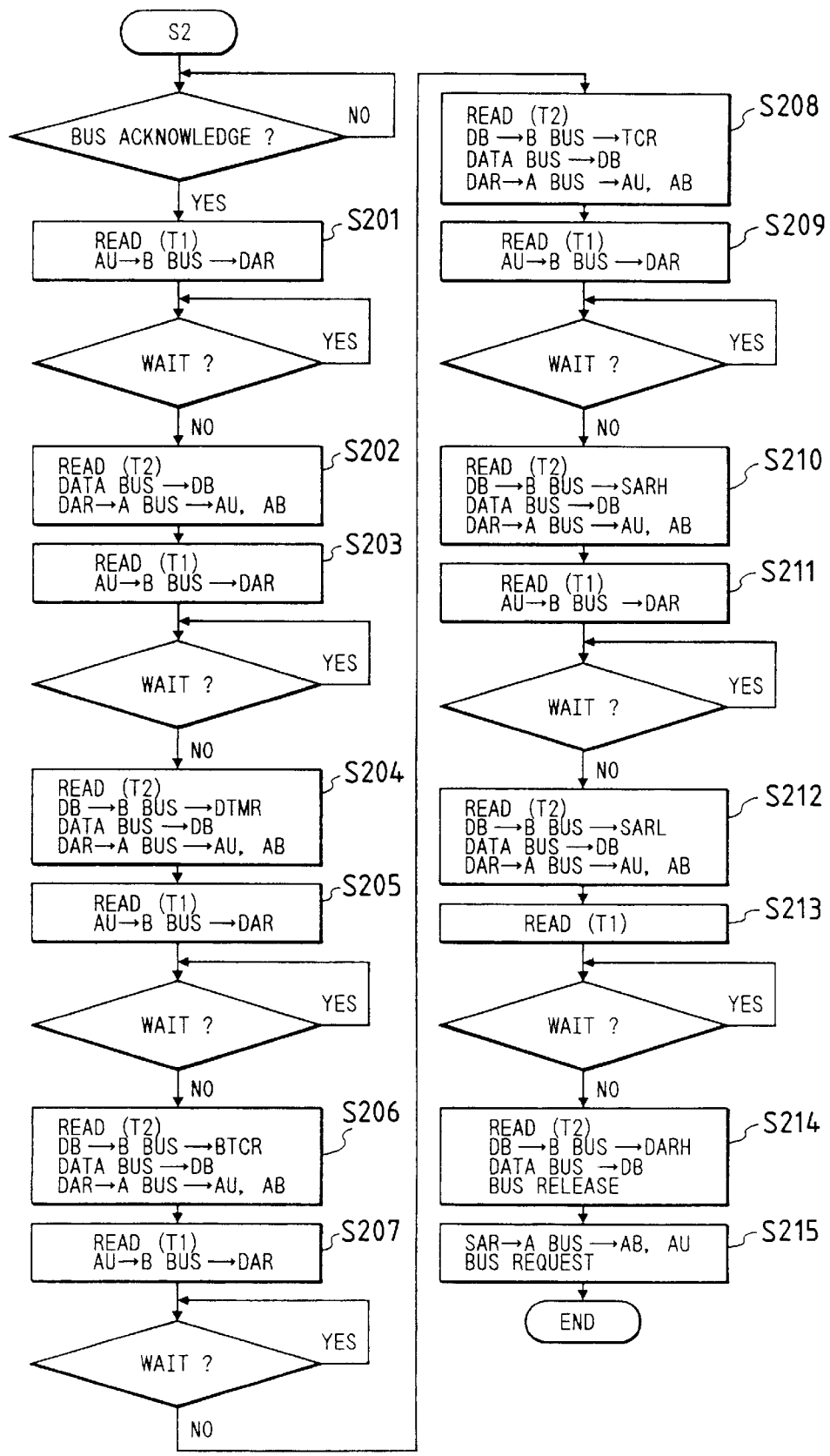
FIG. 18 is an operation flow chart of the DTC in this embodiment at step 2 of FIG. 16.

By referring to FIG. 18, the operation flow of the step 2 of FIG. 16 is described in detail.

The step 2 (S2) is performed following the step 106 (S106). First, a check is made to see if the bus is obtained by referencing the bus acknowledge signal. If the result of this decision is "NO," the DTC is kept waiting until the bus use is permitted. At the same time, the DTC wait signal indicating that the DTC is waiting is activated.

When the bus acknowledge signal is activated and the DTC wait signal is deactivated, a step 201 (S201) initiates the read cycle, storing the incremented contents into DAR via B bus. If, in this read cycle, a wait is demanded, the DTC is made to wait until the wait is reset.

At step 202 (S202) the read cycle is finished, and the contents of data bus are taken into the data buffer (DB). The contents of VAR+2 (m+2) stored in DAR are supplied to the address buffer (AB) via A bus and output to DTAB. Then, the contents of A bus are taken into AU where they are incremented (+2).

At step 203 (S203) a read cycle is started, and the incremented contents are stored into DAR through B bus. In this read cycle, if a wait is demanded, the DTC is kept waiting until the wait is reset.

At step 204 (S204) the contents of DB are stored into DTMR via B bus. Then, the read cycle is finished and the contents of the data bus are taken into the data buffer (DB). At this time, the output from DB to B bus in synchronism with φ is performed before the input from data bus to DB in synchronism with φ#.

Further, the contents (m+4) of VAR+4 stored in DAR are fed into the address buffer (AB) bia A bus and output to DTAB. The contents of A bus are taken into AU where they are incremented (+2).

At step 205 (S205) a read cycle is started, and the incremented contents are stored in DAR through B bus. If in this read cycle a wait is demanded, the DTC is made to wait until the wait is canceled.

At step 206 (S206) the contents of DB are stored in BTCR through B bus. Then the read cycle is finished and the contents of the data bus are taken into the data buffer (DB).

Further, the contents (m+6) of VAR+6 stored in DAR are fed into the address buffer (AB) via A bus and output to DTAB. Then, the contents of A bus are taken into AU where they are incremented (+2).

At step 207 (S207) a read cycle is started. The incremented contents are stored into DAR via B bus. If in this read cycle a wait is demanded, the DTC is kept waiting until the wait is reset.

At step 208 (S208) the contents of DB are stored into TCR via B bus. Then the read cycle is completed, and the contents of the data bus are taken into the data buffer (DB).

Further, the contents (m+8) of VAR+8 stored in DAR are fed to the address buffer (AB) via A bus and output to DTAB. Then the contents of A bus are taken into AU where they are incremented (+2).

At step 209 (S209) a read cycle is started, and the incremented contents are stored in DAR via B bus. If in this read cycle a wait is demanded, the DTC is kept waiting until the wait is reset.

At step 210 (S210) the contents of DB are stored into the upper 16 bits (SARH) of SAR via B bus. Then the read cycle is completed and the contents of data bus are taken into the data buffer (DB).

The contents (m+10) of VAR+10 stored in DAR are fed into the address buffer (AB) via A bus and output to DTAB. Then, the contents of A bus are taken into AU where they are incremented (+2).

At step 211 (S211) a read cycle is started, and the incremented contents are fed to DAR via B bus. If in this ready cycle a wait is demanded, the DTC is made to wait until the wait is reset.

At step 212 (S212) the contents of DB are sent to the lower 16 bits (SARL) of SAR via B bus. Then the read cycle is completed, and the contents of the data bus are taken into the data buffer (DB). Further, the contents (m+12) of VAR+12 stored in DAR are fed to the address buffer (AB) via A bus and output to DTAB.

At step 213 (S213) a read cycle is started. If in this read cycle a wait is demanded, the DTC is made to wait until the wait is reset.

At step 214 (S214) the contents of DB are fed to the upper 16 bits (DARH) of DAR via B bus. Then the read cycle is completed, and the contents of the data bus are taken into the data buffer (DB). The bus request signal is deactivated to release the bus.

At step 215 (S215) a bus is requested for the next data transfer. The contents of SAR are input to AB via A bus and output to DTAB. Then, the contents of A bus are taken into AU where they are processed according to SM1 and SM0 bits. The contents of the lower 16 bits (DARL) of DAR stored in DB are saved in DAR by step 3 (S3).

Figure 19:
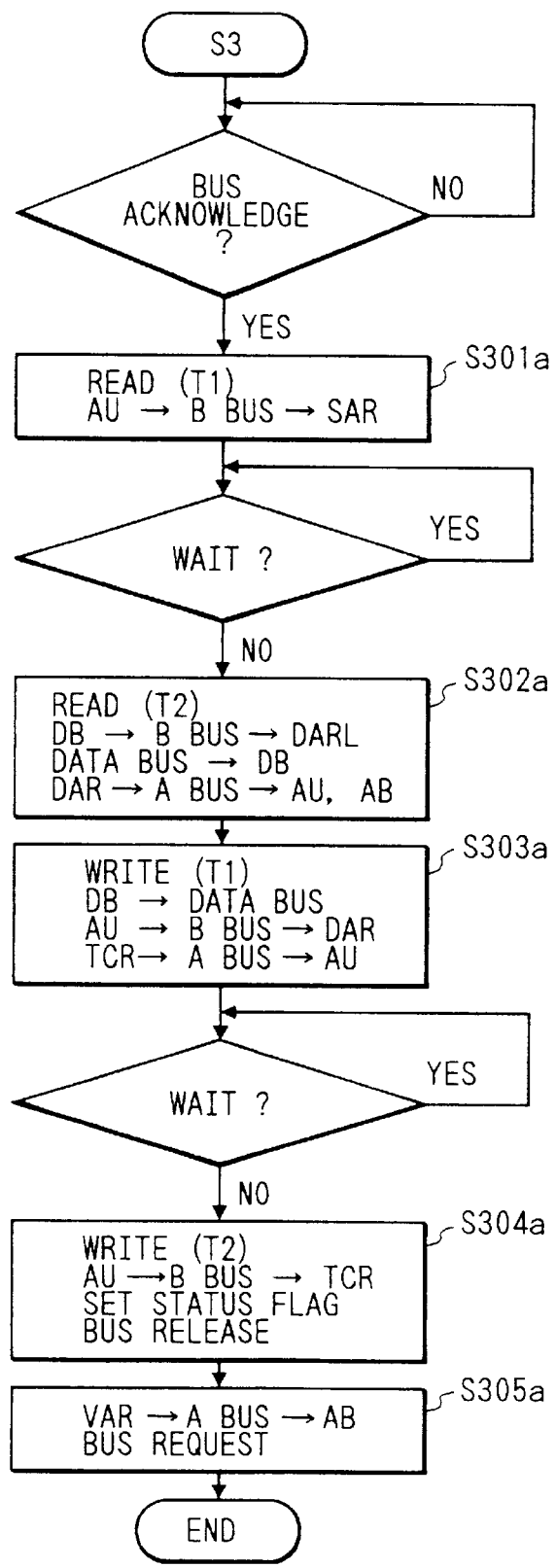
FIG. 19 is an operation flow chart of the DTC in this embodiment at step 3 of FIG. 16 while in a normal mode.

By referring to FIG. 19, the operation flow of the normal mode in step 3 of FIG. 16 will be described in detail.

The step 3 (S3) is performed following the step 215 (S215). First, the bus acknowledge signal is checked to decide whether the bus is acquired. If this decision is "NO," the DTC is kept waiting until the bus use is permitted. At the same time, the DTC wait signal indicating that the DTC is waiting is activated.

Then, when the bus acknowledge signal is activated and the DTC wait signal becomes deactivated, a step 301a (S301a) initiates a read cycle. The contents processed by AU are stored in SAR via B bus. If in this read cycle a wait is demanded, the DTC is made to wait until the wait is reset.

At step 302a (S302a) the contents of DB are fed to the lower 16 bits (DARL) of DAR via B bus. Then the read cycle is finished and the contents of the data bus are taken into the data buffer (DB).

Further, the contents of DAR are fed to the address buffer (AB) via A bus and output to DTAB. Then, the contents of A bus are taken into AU where they are processed according to DM1 and DM0 bits.

At step 303a (303a) a write cycle is started and the contents of DB are output to the data bus. The contents processed by the AU are saved in DAR via B bus, and the contents of TCR are taken into AU where they are decremented. If in this write cycle a wait is demanded, the DTC is made to wait until the wait is reset.

At step 304a (s304a) the write cycle is completed, and the contents decremented by AU are saved into TCR via B bus. An internal status flag is set to indicate whether the result of this decrement is H'0000 or not. Then, the bus request signal is deactivated to release the bus.

At step 305a (S305a) a bus is requested for writing the next register file. At the same time, the contents (m) of VAR are fed to the address buffer (AB) via A bus and output to DTAB. Then, the contents of A bus are taken into AU where they are incremented (+2).

Figure 20:
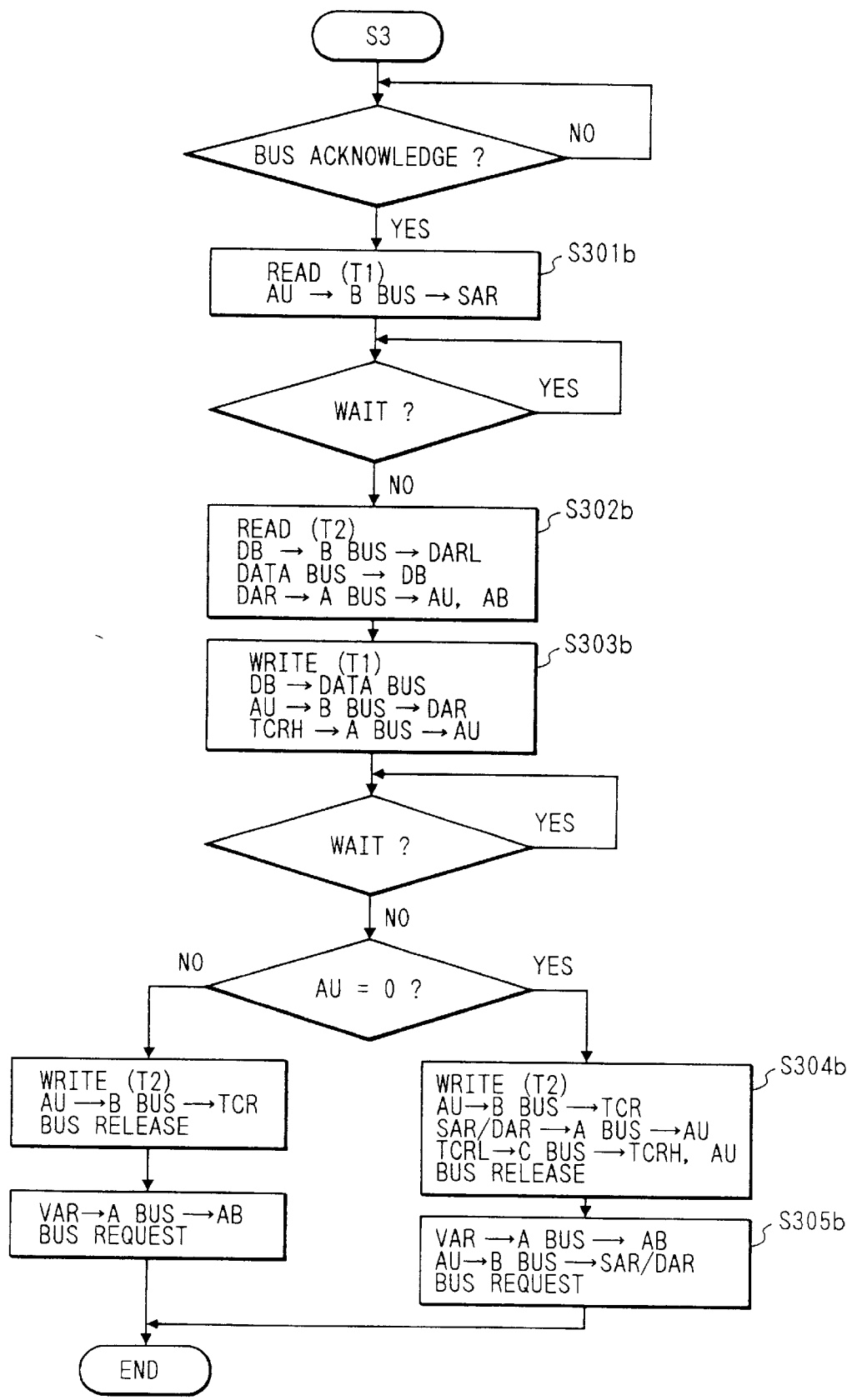
FIG. 20 is an operation flow chart of the DTC in this embodiment at step 3 of FIG. 16 while in a repeat mode.

By referring to FIG. 20, the operation flow of the repeat mode in step 3 of FIG. 16 is explained in detail.

First, a bus acknowledge signal is checked to decide whether the bus is acquired. If the decision produces a result "NO," the DTC is made to wait until the bus use is permitted. At the same time, the DTC wait signal indicating that the DTC is waiting is activated.

Then when the bus acknowledge signal is activated and the DTC wait signal is deactivated, a step 301b (S301b) starts a read cycle. The contents processed by AU are saved into SAR via B bus. If in this read cycle a wait is demanded, the DTC is made to wait until the wait is reset.

At step 302b (S302b) the contents of DB are saved into the lower 16 bits (DARL) of DAR via B bus. Then the read cycle is completed, and the contents of the data bus are taken into the data buffer (DB).

Further, the contents of DAR are input to the address buffer (AB) via A bus and output to DTAB. The contents of A bus are taken into AU where they are processed according to DM1 and DM0 bits.

At step 303b (S303b) a write cycle is started and the contents of DB are output to the data bus. The contents processed by the AU are saved into DAR via B bus, and the contents of TCRH are taken via A bus into AU where they are decremented. If in this write cycle a wait is demanded, the DTC is made to wait until the wait is reset.

At step 304b (S304b) the write cycle is completed and the contents of the data bus are taken into the data buffer (DB). Then the contents decremented by the AU are saved into TCRH via B bus.

If the result of decrement is H'00, the initial values of SAR or DAR and TCRH are reinstated. Then, as mentioned above, if the DTS bit is cleared to "0," the contents of DAR are input to AU via A bus. If the DTS bit is set to "1," the contents of SAR are input to AU via A bus.

Then, the contents of TCRL are output onto C bus and saved into TCRH. They are also supplied to AU through selector and shifter. The processing done by the selector, shifter and AU are as described earlier. Then, the bus request signal is deactivated to release the bus.

At step 305b (S305b) the contents processed by AU are saved into SAR or DAR via B bus and a bus request is made for writing the next register file. At the same time, the contents (m) of VAR are fed to the address buffer (AB) via A bus and output to DTAB. Then, the contents of A bus are taken into AU where they are incremented (+2).

Figure 21:
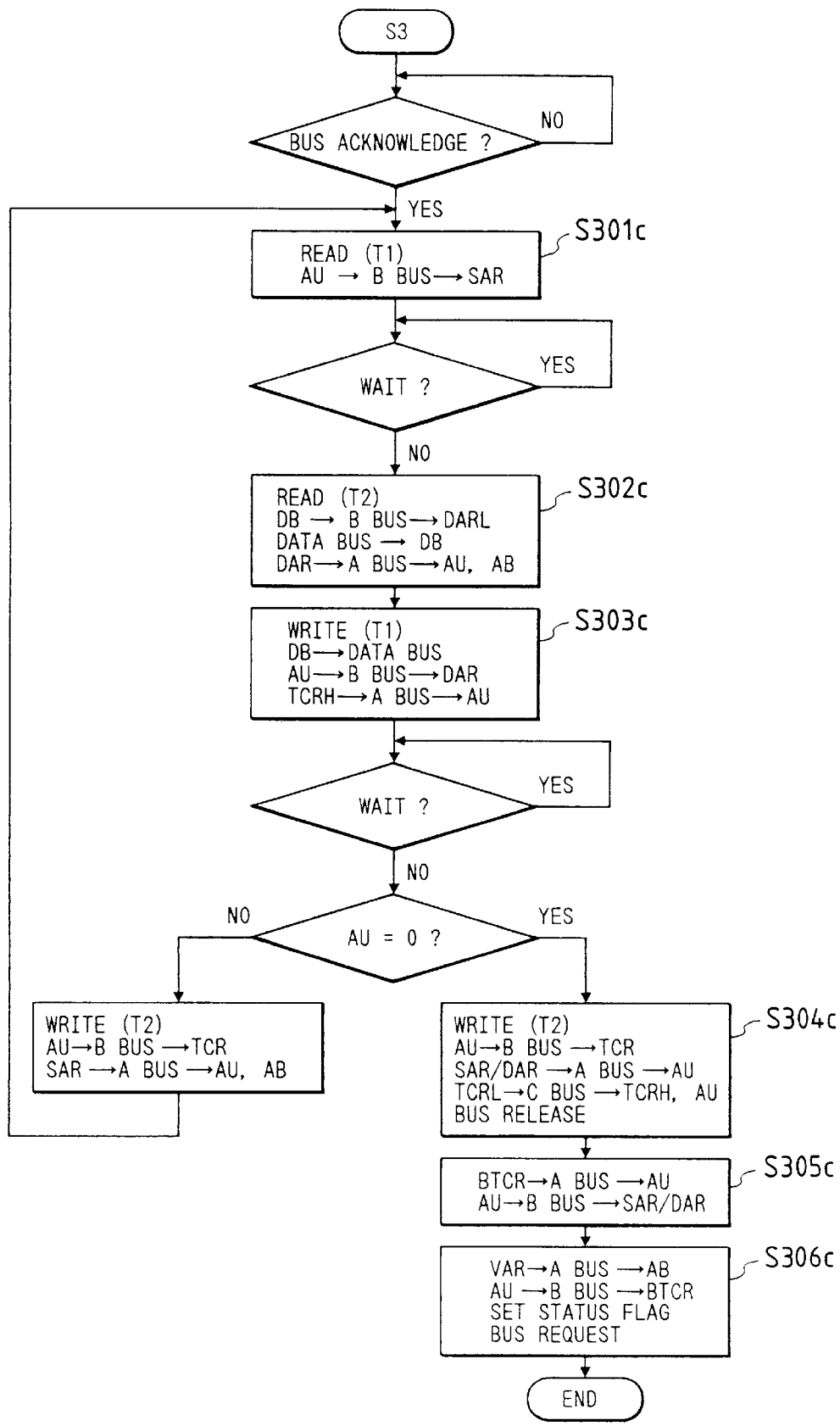
FIG. 21 is an operation flow chart of the DTC in this embodiment at step 3 of FIG. 16 while in a block transfer mode.

By referring to FIG. 21, the operation flow of the block transfer mode in step 3 of FIG. 16 are explained in detail.

First, a bus acknowledge signal is checked to decide whether the bus is acquired. If this decision produces a result "NO," the DTC is kept waiting until the bus use is permitted. At the same time, the DTC wait signal indicating that the DTC is waiting is activated.

When the bus acknowledge signal becomes active and the DTC wait signal is deactivated, a step 301c (S301c) starts a read cycle. The contents processed by the AU are saved in SAR through B bus. If in this read cycle a wait is demanded, the DTC is made to wait until the wait is reset.

At step 302c (S302c) the contents of DB are sent to the lower 16 bits (DARL) of DAR via B bus. Then the read cycle is completed and the contents of the data bus are taken into the data buffer (DB).

The contents of DAR are input to the address buffer (AB) via A bus and output to DTAB. The contents of A bus are taken into AU where they are processed according to DM1 and DM0 bits.

At step 303c (S303c) a write cycle is started and the contents of DB are output to the data bus. The contents processed by AU are saved into DAR via B bus and the contents of TCRH are taken via A bus into AU where they are decremented. If in this write cycle a wait is demanded, the DTC is made to wait until the wait is reset.

At step 304c (S304c) the write cycle is completed and the contents of the data bus are taken into the data buffer (DB). The contents decremented by the AU are saved in TCRH via B bus.

If the decremented result is not H'00, the contents of SAR are input to the address buffer (AB) via A bus and output to DTAB. The contents of A bus are taken into AU. The program then branches to step 301c (S301c).

If the decremented result is H'00, the initial set values of SAR or DAR and TCRH are reinstated. When the DTS bit is cleared to "0," as mentioned above, the contents of DAR are sent to AU via A bus. When the DTS bit is set to "1," the contents of SAR are sent to AU via A bus.

Further, the contents of TCRL are output to C bus and saved into TCRH, and at the same time supplied to AU via selector and shifter. The processing done by the selector, shifter and AU are already mentioned above. Then, the bus request signal is deactivated to release the bus.

At step 305c (S305c) the contents processed by AU are saved into SAR or DAR via B bus. Then the contents of BTCR are taken via A bus into AU where they are decremented.

At step 306c (S306c) the contents decremented by AU are saved into BTCR via B bus. An internal status flag is set to indicate whether the decremented result is H'0000 or not. Then a bus request is made to write the next register file.

At the same time, the contents (m) of VAR are input to the address buffer (AB) via A bus and output to DTAB. Then the contents of A bus are taken into AU where they are incremented (+2).

Figure 22:
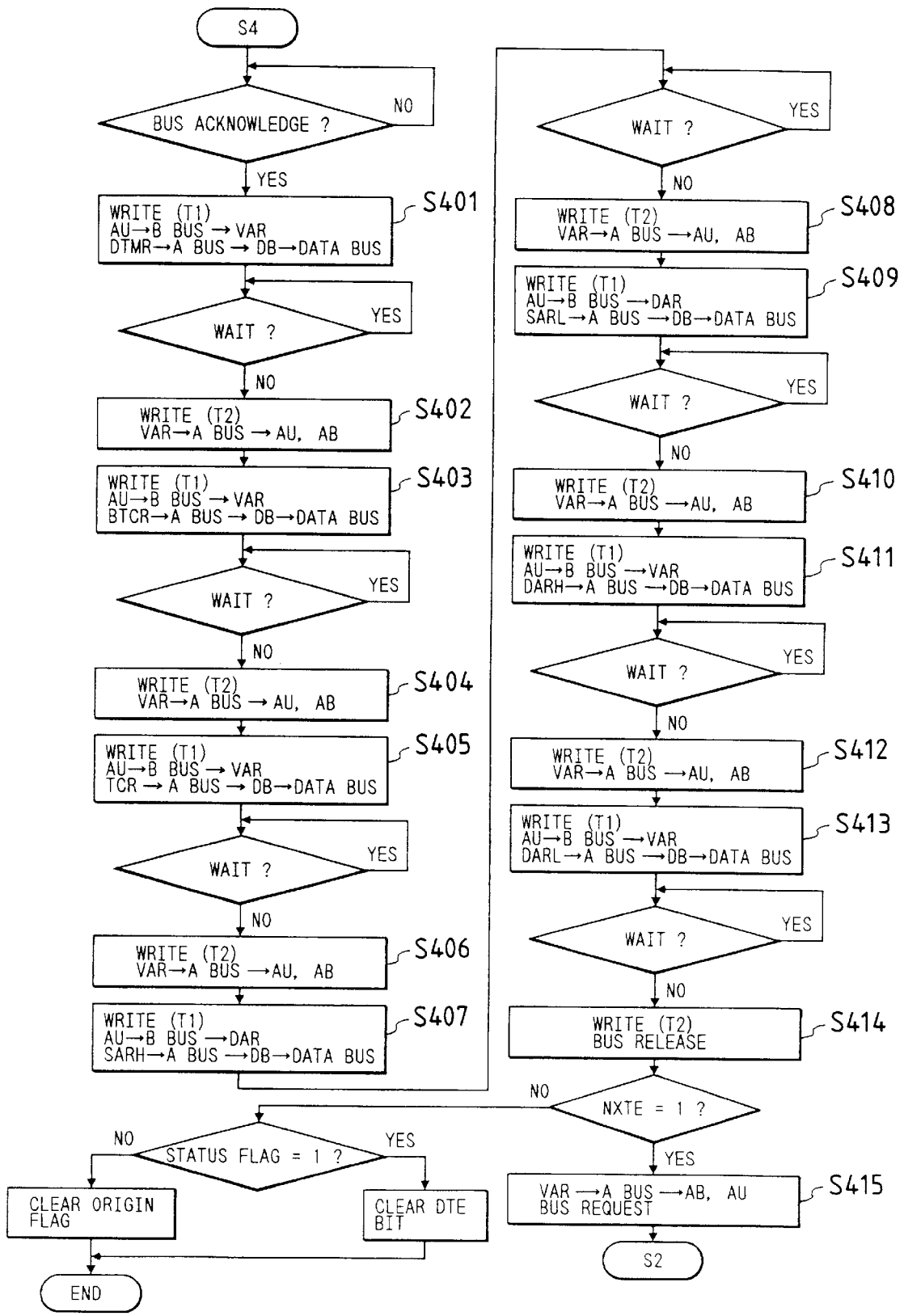
FIG. 22 is an operation flow chart of the DTC in this embodiment at step 4 of FIG. 16.

By referring to FIG. 22, the operation flow of step 4 of FIG. 16 is explained in detail.

A step 4 (S4) is performed following the step 305a (S305a) or step 306c (S306c). First, a bus acknowledge signal is checked to decide whether a bus is acquired. If this decision produces a result "NO," the DTC is made to wait until the bus use is permitted. At the same time, the DTC wait signal indicating that the DTC is standing by is activated.

When the bus acknowledge signal is activated and the DTC wait signal becomes deactivated, a step 401 (S401) starts a write cycle, and the incremented contents are saved into VAR via B bus. Then the contents of DTMR are input to DB via A bus and output to the data bus. If in this write cycle a wait is demanded, the DTC is made to wait until the wait is reset.

At step 402 (S402), the write cycle is completed and the contents (m+2) of VAR are input to the address buffer (AB) via A bus and output to DTAB. Then, the contents of A bus are taken into AU where they are incremented (+2).

At step 403 (S403), a write cycle is started and the incremented contents are stored into VAR via B bus. Then the contents of BTCR are entered into DB via A bus and output to the data bus. If in this write cycle a wait is demanded, the DTC is made to wait until the wait is reset.

At step 404 (S404) the write cycle is completed and the contents (m+4) of VAR are input to the address buffer (AB) via A bus and output to DTAB. Then the contents of A bus are taken into AU where they are incremented (+2).

At step 405 (S405) a write cycle is started and the incremented contents are stored into VAR via B bus. The contents of TCR are entered into the DB via A bus and output to the data bus. If in this write cycle a wait is demanded, the DTC is made to wait until the wait is reset.

At step 406 (S406) the write cycle is completed and the contents (m+6) of VAR are entered into the address buffer (AB) via A bus and output to DTAB. Then the contents of A bus are taken into AU where they are incremented (+2).

At step 407 (S407) a write cycle is started and the incremented contents are stored into DAR via B bus. The contents of the upper 16 bits (SARH) of SAR are entered into DB via A bus and output to the data bus. If in this write cycle a wait is demanded, the DTC is made to wait until the wait is reset.

At step 408 (S408) the write cycle is completed and the contents (m+8) of VAR are entered into the address buffer (AB) via A bus and output to DTAB. Then the contents of A bus are taken into AU where they are incremented (+2).

At step 409 (S409) a write cycle is started and the incremented contents are stored into DAR via B bus. Then the contents of lower 16 bits (SARL) of SAR are input to DB via A bus and output to the data bus. If in this write cycle a wait is demanded, the DTC is made to wait until the wait is reset.

At step 410 (S410) the write cycle is completed and the contents (m+10) of VAR are entered into the address buffer (AB) via A bus and output to DTAB. Then the contents of the A bus are taken into AU where they are incremented (+2).

At step 411 (S411) a write cycle is started and the incremented contents are stored into VAR via B bus. The contents of upper 16 bits (DARH) of DAR are entered into DB via A bus and output to the data bus. If in this write cycle a wait is demanded, the DTC is made to wait until the wait is reset.

At step 412 (S412) the write cycle is completed and the contents of the data bus are taken into the data buffer (DB). The contents (m+12) of VAR are entered into the address buffer (AB) via A bus and output to DTAB. Then the contents of the A bus are taken into AU where they are incremented (+2).

At step 413 (S413) a write cycle is started and the incremented contents are stored into VAR via B bus. The contents of lower 16 bits (DARL) of DAR are entered into DB via A bus and output to the data bus. If in this write cycle a wait is demanded, the DTC is made to wait until the wait is reset.

At step 414 (S414) the write cycle is completed and the bus request signal is deactivated to release the bus.

If the NXTE bit is set to "1," a step 415 (S415) requests the use of bus for reading the next register file, and feeds the contents of VAR to AB via A bus and to DTAB. Then, the contents of A bus are taken into AU where they are incremented (+2). After this, the program returns to step 2 (S2).

If the NXTE bit is cleared to "0," the origin clear signal or DTC enable bit clear signal is activated. That is, when the transfer counter is not "0" and the internal status flag is cleared to "0," the origin clear signal is activated. When the transfer counter is "0" and the internal status flag is "1," the DTC enable bit clear signal is activated.

In step 4, it is possible not to save the contents of register that were not updated. Further, the DTC's internal operations in the flow chart may be made identical and the write operation may not be performed by releasing the bus. Further, the CPU need not be stalled, or the internal operation may be changed to eliminate the number of steps. In this case, the increment before elimination of step number is (+4) rather than (+2).

If BTCR is not used, the read operation in step 1 and the write operation in step 4 may both be eliminated. Alternatively, BTCR may be eliminated from the memory (RAMP). Further, if a plurality of data transfers are performed by a single start origin, it is possible to reduce the time which elapses from the occurrence of the start origin to the completion of the last data transfer.

FIG. 23 shows a first example of operation timing of internal buses. FIG. 23 represents a case of the normal mode data transfer from RAMP to I/O. A step number corresponding to the operation flow in FIG. 17 to 22 is added at the end of each of the following paragraphs.

IAB and DTAB are output in synchronism with $\phi\#$, an inverted signal of $\phi$. The read operation by CPU on ROM and RAMI is performed in one state. IAB is output in one state in synchronism with $\phi\#$ and, in this instance, is latched in ROM and RAMI in synchronism with $\phi$. The read data corresponding to this address is output in synchronism with $\phi\#$ and is taken into CPU while $\phi\#$ is active.

For example, the data corresponding to the address that was output to IAB in synchronism with $\phi\#$ at T1 is taken into the CPU while $\phi\#$ at T2 is active. On the other hand, the read/write operation on RAMP is performed in two states and the read/write operation on I/O in three states. IAB or DTAB is synchronized with $\phi$ by BSC.

First, the interrupt controller IRC activates the DTC start request signal to start the DTC. The DTC, upon being activated, activates the start signal, latching the DTC vector number of the interrupt controller IRC.

At T1, the CPU fetches an instruction from ROM, an address is output to IAB, and the DTC is started. At this time, the DTC activates the DTC bus request signal and outputs the DTC vector address generated by VAG to DTAB via A bus. Then the contents of A bus are taken into AU where they are incremented (step 101 (S101)).

At T2, the CPU takes in an instruction code read out from ROM to IDB, and an address for the next instruction fetch is output to IAB. Similar operation is repeated, reading ROM by CPU, until T8. At this time the DTC bus acknowledge signal is activated, the contents of DTAB is synchronized with φ and output to PAB, and the DTC reads RAMP. Then, the result of increment by AU is stored into DAR via B bus (step 102 (S102)).

At T3, the contents (mH) of higher-order 16 bits of VAR read out from RAMP onto PDB are taken into the data buffer (DB) of DTC. Then, the contents of DAR (DTC vector address+2) are output to DTAB via A bus (step 103 (S103)).

At T4, the contents of DTAB are synchronized with φ and output to PAB, and the DTC reads RAMP. Then the contents of the data buffer (DB) are stored into the upper 16 bits of VAR via B bus (step 104 (S104)).

At T5, the contents (mL) of lower 16 bits of VAR read out from RAMP to PDB are taken into the data buffer (DB) of DTC. Then the DTC deactivates the DTC bus request signal to release the bus temporarily (step 105 (S105)).

At T6, PAB and PDB are not used, with PAB maintaining the previous state. The DTC activates the DTC bus request signal, and stores the contents of the data buffer (DB) into the lower 16 bits of VAR via B bus. The contents (m) of VAR are output to DTAB via A bus and constitute the start address of the register file. The contents of the A bus are taken into AU where they are incremented (+2) (step 106 (S106)).

At T7, the DTC bus acknowledge signal is activated, DTAB is synchronized with φ and output to PAB, and RAMP is read. The result of increment is stored into DAR via B bus (step 201 (S201)).

At T8, the contents of DTMR read from RAMP to PDB are taken into the DTC data buffer (DB) (step 202 (S202)). At T9 through T19, the register file is successively read out. In FIG. 23, eight states from T11 to T18 are not shown.

At T20, the contents of DARH are taken into the data buffer (DB) of DTC. Then the DTC bus request signal is deactivated to temporarily release the bus (step 214 (S214)).

At this time, the address that the CPU output onto IAB at T10 corresponds to I/O and the bus arbitration is performed. Because the CPU is lower in priority order than the DTC, the CPU bus acknowledge signal is deactivated, stalling the CPU.

Since at T20 the DTC released the bus, the CPU is allowed to use the bus, synchronizing the contents of IAB with φ, outputting them to PAB and performing the read on I/O. The corresponding data is read onto PDB at T23 and taken into CPU via IDB.

At T21, the DTC activates the DTC bus request signal to request the bus. But because the CPU is currently using the bus, the DTC bus acknowledge signal is deactivated, stalling the DTC. Further, from T22 the DTC wait signal becomes active, causing the DTC to stand by.

At T23, the CPU outputs the ROM address onto IAB, starting the read operation. Then, from the next cycle the CPU and the DTC resume their parallel operation.

At T24, the DTC bus acknowledge signal is activated, the DTC wait signal is deactivated, and the contents of the data buffer (DB) are stored into DARH via B bus. Then, the DTC reads RAMP and the DTAB is synchronized with φ before being output to PAB (step 301a (S301a)).

At T25, the contents of PDB are taken into the data buffer (DB) of the DTC. Then the contents of DAR are output to DTAB via A bus (step 302a (S302a)).

At T26, an I/O write cycle is initiated, outputting the contents of the data buffer (DB) to PDB. Here, it is assumed that the I/O performs the read/write operation in three states, and thus the DTC wait signal is activated (step 303a (S303a)).

At T27, the DTC is made to stand by and then the DTC wait signal is deactivated.

At T28, the write cycle is completed. Then, the DTC bus request signal is deactivated, releasing the bus (step 304a (S304a)).

At T29, the DTC bus request signal is activated to request the use of bus. The contents (m) of VAR are output to DTAB via A bus. The contents of A bus are incremented (+2) (step 305a (S305a)).

At T30, the result of increment is stored in VAR, and the DTC bus acknowledge signal is activated, starting a write cycle. Then, the contents of DTMR are output to PDB via A bus and data buffer (DB) (step 401 (S401)).

At T31, the contents (m+2) of VAR are output to DTAB via A bus. The contents of A bus are incremented by AU (+2) (step 402 (S402)).

At T32, the result of increment is stored in VAR. A write cycle is started, outputting the contents of BTCR to PDB via A bus and data buffer (DB) (step 403 (S403)).

At T33, the contents (m+2) of VAR are output to DTAB via A bus. The contents of A bus are incremented by AU (+2), completing the write cycle (step 404 (S404)).

At T34 through T41, the register file is written into successively. Although in FIG. 23 eight states from T34 to T41 are omitted, the similar write cycle is repeated.

At T42, the result of increment is stored into VAR, starting a write cycle. The contents of DARL are output to PDB via A bus and data buffer (DB) (step 413 (S413)).

At T43, the write cycle is completed. Then, the DTC bus request signal is deactivated, releasing the bus (step 414 (S414)). Here, if the NXTE bit is set to "1," the read operation on the next register file is performed (step 2).

At T44, PAB and PDB are not used, with PAB maintaining the previous state. The DTC activates the DTC bus request signal, and stores the contents of the data buffer (DB) into the VAR via B bus. The contents (m+14) of VAR are output to DTAB via A bus and constitute the start address of the register file. The contents of the A bus are taken into AU where they are incremented (+2) (step 106 (S106)).

In the succeeding cycles, an operation identical to one following T7 is performed, and the data transfer is according to the contents of DTMR read at T45 and T46. The DTC transfer completion signal is activated when the data transfer with the NXTE bit cleared is completed.

In this case, it is possible to make the time duration that the CPU is made to stand by smaller than the time taken by the register file read, data transfer and register file write. Because the read/write of the register file is performed for seven words, the time required is 14 states at maximum when the register file is arranged on RAMP.

If the bus is released during the process of reading/writing the register file, the time the CPU is kept waiting can be further reduced.

FIG. 24 shows a second example of the internal bus operation timing. FIG. 24 represents a case of data transfer from I/O to RAMI and explanations concerning those portions that are identical to FIG. 23 are omitted.

The CPU retrieves instructions from ROM via IAB and IDB and, during the period shown in FIG. 24, performs only accesses to IDB side continuously.

The address that the DTC output to DTAB at T24 corresponds to RAMI. At this point, a bus arbitration is performed, giving a bus to the DTC. From T25 the CPU's IAB release signal is activated, outputting the contents of DTAB to IAB.

At T26, the contents of DTAB are latched in RAMI. The data that the DTC has sent to PDB are output to IDB and written into RAMI. During this period the CPU bus acknowledge signal is deactivated, halting the CPU. Then, the CPU's IAB release signal is deactivated, outputting the address that the CPU has produced to IAB.

At T27, the CPU bus acknowledge signal is activated, resuming the CPU operation. At this time, it is assumed that the NXTE bit is cleared. After the register file is written, the DTC bus request signal is deactivated at T42 and the DTC transfer completion signal is activated, stopping the DTC operation.

When the DTC transfer completion signal becomes active, the origin clear signal or DTE clear signal, though not shown, is activated depending on the data transfer mode and the transfer counter contents.

When during the normal mode TCR is H'0000, or when during the block transfer mode BTCR is H'0000, the DTE clear signal becomes active. In other cases, the origin clear signal is activated.

In this way, because the data transfer is from I/O to RAMI, the CPU, when it processes accumulated data, need only use IAB and IDB. This increases the access speed and enables the parallel operation with the DTC, improving the processing efficiency.

FIG. 25 shows an example of operation during the block transfer mode.

The A/D converter of the single chip microcomputer shown in FIG. 1, for example, has four data registers and can convert four channels continuously and store the conversion results in a data register, as can the one described in the "H8/3003 Hardware Manual," published in March 1993 by Hitachi, Ltd. Upon completion of conversion of the four channels, a conversion completion interrupt occurs. The data register has a word size.

The DTC enable bit (DTED7) corresponding to the conversion completion interrupt is set to "1" to enable the DTC. Then, both SM1 and DM1 bit of DTMR are set to "1," both SM0 and DM0 bit are cleared, and SAR and DAR are incremented.

Further, MD1 bit is set to "1" and MD0 bit is cleared to "0," selecting the block transfer mode. TDS is set to "1," making the source side a block area. Sz is set to "1" to make the data transfer a word-size transfer. NXTE is cleared to end the block transfer after one operation.

TCRH and TCRL are set with 4 as a block size, and BTCR is specified with N as the number of blocks to be transferred. N is an integer in the range from 0 to 65536. When N is 65536, H'0000 is set, as mentioned earlier. SAR is set with a start address (TS) of the A/D converter's data register and DAR is set with a start address of RAMP where the conversion result is stored.

When the single conversion completion interrupt starts the DTC, the DTC reads the DTC vector address and, based on the contents thus read, reads the register file, starting the data transfer.

First, the word-size data transfer is performed from a first data register of the A/D converter designated by SAR to an address (TD) on RAMP designated by DAR. Then, SAR and DAR are incremented (+2) and TCRH is decremented.

Further, data is transferred from a second data register of the A/D converter to an address (TD+2) on RAMP; SAR and DAR are incremented (+2); and TCRH is decremented. Similarly, data transfer is performed from a third data register of the A/D converter to an address (TD+4) on RAMP; SAR and DAR are incremented (+2); and TCRH is decremented.

Then data transfer is performed from a fourth data register of the A/D converter to an address (TD+6) on RAMP; SAR and DAR are incremented (+2); and TCRH is decremented. At this time, SAR and DAR are TS+8 and TD+8, respectively, and TCRH is 0.

After this, in SAR, calculation of $SAR-SM1 \cdot ((-1)^{\wedge}SM0) \cdot 2^{\wedge}Sz \cdot TCRL$ is performed to reinstate the initial value TS. The contents of TCRL are transferred into TCRH, completing the data transfer.

Further, the register file is saved, the transfer completion signal is activated, and the interrupt controller clears the origin flag, terminating the DTC operation. Then, the DTC stands by until another interrupt occurs.

When a next interrupt occurs, data transfer is done from the first, second, third and fourth register of the A/D converter to addresses (four words beginning with TD+8) on RAMP, respectively.

This process is repeated. When an N-th interrupt occurs, data is transferred from the first, second, third and fourth register of the A/D converter to addresses (four words beginning with $TD+DM1 \cdot ((-1)^{\wedge}DM0) \cdot (2^{\wedge}Sz) \cdot TCRL \cdot (N-1)$). Here, the origin flag is not cleared and the DTC enable bit is cleared ending the operation.

Then, an A/D conversion completion interrupt is requested to the CPU to perform a desired processing on the DATA on RAMP. In this case, RAMI may be used as mentioned earlier.

With reference to FIG. 26, we will explain an example case where a single chip microcomputer applying the present invention is used on a printer controller.

A printer controller 30 includes a single chip microcomputer 1, a Centronics interface circuit 31, a buffer RAM 32, a character generate ROM 33 (CGROM), a printing data buffer 34, and a printing head 35, all interconnected through an external bus of the single chip microcomputer 1.

The printer controller 30 further includes a buffer circuit 36, a line feed motor 37, and a carriage return motor 38. These motors are controlled by the output of the timer TM and of the pulse output circuit POC, respectively. The line feed motor 37 and the carriage return motor 38 are, in this instance, stepping motors.

Though not shown, the SCI is used for communication with a host computer and the A/D converter receives sensor outputs representing, for instance, the number of paper sheets.

The DTC receives data through the Centronics interface 31, outputs printing data, produces pulses for driving the line feed motor 37 and the carriage return motor 38, and transfers sending and receiving data of SCI.

FIG. 27 shows example uses of DTC in the printer controller of FIG. 26. In this case, five interrupt origins produces a total of eight data transfers.

In the data reception through the Centronics interface 31, the DTC is started by an IRQ0 interrupt produced by an external signal taken into an IRQ0 line to perform data transfer from a data register of the Centronics interface to the buffer RAM 32. Then the DTC supplies a specified signal of the Centronics interface 31, a so-called input strobe signal, to an external interrupt input terminal IRQ0.

Further, the interrupt enable bit and the DTC enable bit (DTEA7) corresponding to the IRQ0 interrupt are set to "1." The DTC sets SAR with an address corresponding to the data register of Centronics interface 31, and clears both the SM1 and SM0 bit to fix SAR.

The DAR in this case is a specified address of the buffer RAM 32; DM1 bit is set to "1" and DM0 bit is cleared to "0"

to specify an increment; TCR is designated with a desired number of data transfers; and BTCR is not used. The operation mode is set to a normal mode by clearing both MD1 and MD0 to "0"; and Sz bit and NXTE bit are cleared to "0."

Further, data fed from the host computer is taken into the Centronics interface 31 at a specified transition point of the input strobe signal. At the same time, an IRQ0 interrupt is given to the single chip microcomputer to start the DTC. Then, the DTC transfers the data taken in from the data register of the Centronics interface 31 to the buffer RAM.

Further, while incrementing the address of the buffer RAM 32, the DTC repeats the transfer—which is performed each time a specified transition occurs in the input strobe signal—the number of times specified in TCR. This allows the DTC to transfer the data sent from the host computer without intervention of CPU. It is, however, noted that the CPU is stalled every transfer in order to read/write the data register and buffer RAM 32 of the Centronics interface 31 connected to external buses via IAB and IDB.

For driving a stepping motor, the DTC performs data transfer upon receiving a compare-match 0 interrupt from the timer A, with the first data transfer executed in a byte-size repeat mode from RAMP to an output buffer register NDR of the pulse output circuit POC and with the second data transfer carried out in a word-size normal mode from RAMP to a compare register TCMR of the timer A.

Further, for the transfer of printing data, the DTC performs data transfer upon receiving a compare-match 0 interrupt from the timer B, sending printing data in a byte-size block transfer mode from the printing data buffer 434 to the printing head 35.

The CPU references the character generate ROM 33 according to the data stored in the buffer RAM 32 and converts the data into font data. Then, the CPU stores the converted data for one line into the printing data buffer 34.

Then, the carriage return motor is driven by using the DTC, timer TM and pulse output circuit POC. The rotation of the carriage return motor 38 moves the printing head 35. Simultaneously with the movement of the printing head, data transfer is performed from the printing data buffer 34 to the printing head 35.

The printing data for each dot-column of one font is transferred as one block. Suppose one font consists of 24×24 dots. Then, one block is 24 bits and requires three bytes.

The timer B, upon occurrence of a compare-match 0, outputs a 0 level (low level) to the timer output terminal, and the compare-match 0 interrupt starts the DTC, performing three data transfers. At this time, three dot-columns, one for each of three font data, are block-transferred one dot-column at a time.

Then, upon occurrence of a compare-match 1, the timer B outputs a 1 level (high level) to the timer output terminal. At the 0-to-1 level transition of the timer output terminal, the printing data for three dot-columns of 24 dots each are printed out simultaneously.

In a data transfer triggered by an SCI reception completion interrupt, data is transferred in a byte-size normal mode from the SCI's transmission data register to the data area on RAMP. At this time, DTMR is set with H'2000 and SAR is fixedly set with the address of the transmission data register. DAR is set with the start address of RAMP which is then incremented.

In a data transfer triggered by an SCI transmission completion interrupt, transmission data prepared in RAMP is transferred in a byte-size normal mode to the transmission data register of SCI. At this time, DTMR is set with H'8000, and SAR is set with the start address of RAMP which is then incremented. DAR is fixedly set with the address of the transmission data register. A transmission completion interrupt flag and a transmission start bit are common.

As described above, this embodiment is capable of performing an arbitrary number of block transfers and is suitably applied for multiple color printing. For instance, printing data corresponding to each of three primary colors may be prepared, and these three single-color printing data may be sent to the respective printing heads 35 in three block transfers.

This embodiment can also be applied to simultaneous printing of three lines using three block transfers. The three block transfers may be triggered either by the same start origin, e.g., compare-match from timer, or by independent start origins, e.g., IRQ1, 2, 3.

With conventional arts such as DMAC described in the "H8/3003 Hardware Manual," published in March 1993 by Hitachi, Ltd., however, the above-mentioned data transfer shown in FIG. 27 cannot be realized as selection of a total number of channels is limited. This is because if multiple block transfers are performed, the number of channels that can be used for other purposes is reduced.

For example, in a case where there are four channels in a so-called full-address mode or eight channels in a short-address mode, if three channels are used for the block transfer mode, the remaining channels are one channel in the full-address mode or two channels in the short-address mode.

Then, if two more channels are used in the short-address mode for driving the motor, there are no channels left for the data reception from the Centronics interface 31, or for transmission and reception of data between SCI and host computer.

With this embodiment, however, because the limitation on the number of channels is eliminated without increasing the logical or physical size, it is possible to realize an arbitrary number of transfers for desired purposes. This eliminates restrictions on the use of channels, improving the degree of freedom of equipment configuration and also the ease of use.

In the data transfer to and from the Centronics interface 31 and in data transfer of printing data, the CPU is stalled while the data register, buffer RAM 32 and printing head 35 of the external Centronics interface 31 are read/written. However, the CPU stall is limited only to the duration of data read and data write in the data transfer, minimizing a reduction in the processing efficiency and realizing a processing performance identical to that of the data transfer by the conventional DMAC.

Further, where the CPU program is located in ROM and the frequency of use of CPU external bus is lower than that of DTC, it is possible to use the external bus via PAB and PDB.

By referring to FIG. 28, an example operation of driving the motor using a repeat mode in the printer controller of FIG. 26 is explained.

In this embodiment, upon occurrence of a compare-match 0 interrupt from the timer A, the DTC, as mentioned before, performs two data transfers, with the second data transfer executed in a normal mode from RAMP to the compare register TCMR of timer A and with the first data transfer executed in a repeat mode from RAMP to an output buffer register NDR of a pulse output device.

This pulse output device, when a compare-match 0 signal is produced by the timer A, outputs the contents of NDR using pulses. Thus, by performing the second data transfer at each occurrence of the compare-match 0 from the timer A, it is possible to rewrite the compare register TCMR of the timer A and change the compare-match period, i.e., the interval between the pulse outputs.

This allows the stepping motor to be accelerated or decelerated. During the acceleration of the motor (phase 1), the contents of the compare register need be progressively reduced, shortening the pulse output intervals. During the constant speed operation of the motor (phase 2), the same value is held.

During the motor deceleration (phase 3), on the other hand, the contents of the compare register are progressively increased to prolong the pulse output intervals. The counter of the timer A is so set that it is cleared to 0 when the counter value agrees with the contents of the compare register. The counter and the compare register are a word size.

The first data transfer, for example, is performed in a repeat mode throughout phase 1 to phase 3, transferring the pulse output data stored in RAMP, i.e., the stepping motor excitation data, to NDR. This excitation data stored in RAMP has N bytes with the start address at TS1.

TCRH and TCRL of the first data transfer are set with N (=BS1−TS1+1), and SAR is set with the start address TS1 of the excitation data. SM1 bit is set to 1; and SM0, DM1, DM0 and MD1 bit are all cleared to 0; MD0 and DTS bit are set to "1"; Sz bit is cleared to 0; and NXTE bit is set to "1."

At each occurrence of the compare-match interrupt, the DTC performs data transfer from RAMP to NDR by incrementing SAR, decrementing TCRH, and transferring data from address BS1 (=TS1+N−1) to NDR. When TCRH is H'00, calculation of SAR−SM1·((−1)^SM0)·(2^Sz)·TCRL is performed and the contents of TCRL are transferred to TCRH to recover the initial value, continuing the data transfer.

Here, the overall revolution is represented by M1 and the revolution during acceleration and deceleration is M2. The compare-match periods are stored in RAMP over the range of M2+1 words starting from TS2 and arranged in the order of magnitude.

In phase 1, the second data transfer is performed in normal mode by incrementing SAR and fixing DAR. That is, SM1 bit is set to 1, SM0, DM1, DM0, MD1 and MD0 are all cleared to 0, Sz bit is set to 1, and NXTE bit is cleared to 0. TCR is set with M2 and SAR is set with the start address TS2+2 of the compare match period.

Then, the CPU sets the DTC enable bit (DTEB7) to 1, writes the contents of address TS2 into the compare register, and starts the timer A to produce a compare-match 0 interrupt. At each compare-match, the DTC transfers the contents of RAMP to the compare register one word at a time. When the compare-match occurs M2 times, the TCR becomes "0" and the DTC clears the DTEB7 bit to "0," requests an interrupt to CPU and temporarily stops its operation including the first data transfer.

Further, in phase 2, the second data transfer is carried out in a normal mode by fixing SAR. That is, SM1, SM0, DM1, DM0, MD1 and MD0 bit are all cleared to "0"; Sz bit is set to "1"; and NXTE bit is cleared to "0." Then, in response to the interrupt request, the CPU executes an interrupt routine, setting M1−M2×2 in TCR and setting DTMR as mentioned above. Further, the CPU sets the DTEB7 to "1" and, when a compare-match occurs, transfers the contents of an address BS2 (−TS2+(M2−1)×2) to the compare register. When the compare-match occurs M1−M2×2 times, TCR becomes "0" and the DTC clears the DTEB7 bit to "0," requests an interrupt to CPU and temporarily stops its operation including the first data transfer.

Further, in phase 3, the second data transfer is carried out by decrementing SAR. That is, SM1 and SM0 bit are both set to "1"; DM1, DM0, MD1 and MD0 bit are all cleared to "0"; Sz bit is set to "1"; NXTE bit is cleared to "0"; and the compare-match periods stored in RAMP are transferred to the compare register TCMR.

Then, in response to the interrupt request, the CPU executes an interrupt routine, setting M2 in TCR and setting DTMR as mentioned above. Further, the CPU sets the DTEB7 to "1" and, when a compare-match 0 occurs, transfers the contents of RAMP to the compare register while successively subtracting the address from the contents of an address BS2 (=TS2+(M2−1)×2). When the compare-match occurs M2 times, TCR becomes "0" and the DTC clears the DTEB7 bit to "0," requests an interrupt to CPU and temporarily stops its operation including the second data transfer.

Then, the CPU executes the interrupt routine. When the compare-match occurs M1 times, the CPU understands that the stepping motor has performed a specified number of revolutions and that the printing head has traveled a specified distance, thus stopping the timer A before terminating the CPU operation. The pulse output device also is stopped holding the last output value. It is also possible to clear the output of the pulse output device to "0" (outputting a low level).

When, after this, the stepping motor is to be reversed, the first data transfer is performed by setting the last address of the excitation data in SAR and setting SM0 bit to "1." Then, the first data transfer need only repeat the above-mentioned operation. Because the contents of the compare register of the timer A are the contents of address TS2, the CPU need not perform data transfer.

As mentioned above, the pulse output data and compare-match periods set in RAMP are fixed according to the system and therefore are considered not necessary to change during operation. When the data that are not processed by the CPU during the operation are used as the data transfer source, it is advantageous to use RAMP rather than RAMI.

Next, by referring to FIG. 29, we will explain a block diagram of a single chip microcomputer, a variation of this embodiment.

The single chip microcomputer of FIG. 29 has a direct memory access controller (DMAC) added to the single chip microcomputer of FIG. 1. The DMAC is connected to IAB and IDB as is CPU. The CPU and the DMAC operate exclusively from each other according to the bus arbitration of the BSC.

As start origins for data transfer, the DMAC has an auto request function and an external request function. The auto request function is triggered by the CPU setting a specified control bit to "1"; and the external request function is triggered by a specified signal given to the DMA request terminal.

As transfer modes, the DMAC has a burst mode and a cycle steal mode for the auto request. In the burst mode, the CPU is stopped and the DMAC solely uses the bus for data transfer. In the cycle steal mode, the DMAC releases the bus at each data transfer so that the DMAC and the CPU alternately operate for data transfer. These are the points where the DMAC differs from the DTC.

The DMAC is suited for transferring a large amount of data at one time. For the storage of large-scale data in ROM, RAMI or external memory, it is appropriate to connect the DMAC to IAB and IDB and, through them, to external bus. Further, it is possible to realize an interrupt-invoked data transfer with the DTC and a large-scale data transfer with the DMAC.

Because this embodiment of the single chip microcomputer has the configuration in which the internal address bus IAB and internal data bus IDB are connected to CPU, ROM, RAMI and BSC, while the internal address bus PAB and internal data bus PDB are connected to BSC, RAMP, timer, pulse output circuit, SCI, A/D converter, interrupt controller and IOP0–11, with PDB connected to the DTC, the following advantages are obtained.

(1) DTC's data transfer information or parameter which is located on RAM is moved from RAM into DTC at the start of DTC so that the DTC can perform data transfer according to the data transfer information. After data transfer is completed, the data transfer information is saved in RAM to prevent an increase in physical and logical size of the DTC or to deal with a large number of start requests or transfer requests. This also makes it possible to accept two or more start requests or transfer requests in parallel.

This in turn allows the number of bits of the address register to be increased to improve the freedom of use of the DTC. Furthermore, by separating the bus connected with CPU and the bus connected with DTC from each other, the processing speed of the single chip microcomputer can be enhanced.

(2) Because separate RAM's are connected to the respective buses, the CPU and the DTC can be prevented from restricting the operation of each other, facilitating their simultaneous operations, improving the processing speed of the single chip microcomputer.

(3) Because two or more data transfers can be triggered by a single start request or transfer request, the load of CPU is further alleviated, improving the processing speed of the single chip microcomputer and the program generation efficiency. Furthermore, an arbitrary number of transfers can be performed by an arbitrary start origin. This in turn makes it possible to perform any data transfer for any purpose, eliminate restrictions on use of the single chip microcomputer, and improve the degree of freedom of system configuration and ease of use.

(4) The bus use priority is set higher for the DTC than for the CPU in order to include a state of not using the bus in the operation of the DTC. This can prevent the CPU from being stalled for a long period, minimizing a reduction in the processing speed.

(5) By making the data transfer information indirectly specifiable, it is possible to arrange an arbitrary number of sets of transfer information and realize data transfers in an arbitrary number of sets of arbitrary transfer modes. Further, the utilization of memory can also be improved.

The present invention has been described in conjunction with the preferred embodiment. It is noted that the invention is not limited to the embodiment and that various modifications may be made without departing from the spirit of the invention.

For example, the number of bits of the address register is not limit to 32 bits and can be changed according to the address space of the CPU or single chip microcomputer. If the address space has 16M bytes, the address register may be 24 bits long. Or if the address transfers are limited to those between I/O and RAMP, the address register may be 16 bits long. It is also possible to differentiate the number of bits between SAR and DAR.

In this case, if the number of bits is reduced, the overall number of bytes in the register file can also be reduced, shortening the time taken by the reading/writing of the register file. This further reduces the time which elapses from the moment the start is requested until the data transfer is executed.

Further, where a plurality of data transfers are triggered by a single start origin, it is possible to reduce the time which elapses between the start request and the last data transfer, thus improving the real-time performance. Where the frequency of starting the DTC is high, this invention can also improve the processing efficiency, reducing the maximum time that the CPU is stalled.

The CPU program may be stored in external memory as well as in ROM, and the input/output timing of external address bus and external data bus may be made identical with that of PAB and PDB.

Likewise, the memory, the work area for CPU, is not limited to RAMI and may be located in external memory. ROM or RAMI may not be incorporated in the chip as long as CPU can read programs via bus that can be separated from DTC.

The DTC's vector addresses may be located in ROM in addition to RAMP. In this case, although the CPU is stalled when the vector addresses are read, it is possible to eliminate the step to write desired addresses in RAMP immediately after the start of the single chip microcomputer operation.

Similarly, the DTC register file may be located in external memory in addition to RAMP. In this case, input/output of external addresses and data may be performed through input/output ports or buffer circuits connected to PAB and PDB.

The RAMP need only be a memory that can be read and written and may use an EEPROM (electrically erasable and programmable ROM).

Further, it is possible to form RAMI and RAMP into a single memory module in the form of a so-called dual port RAM. In this case, when CPU and DTC simultaneously read/write RAM, one of them is made to wait and the same operation as mentioned in the above embodiment can be performed.

Further, the circuit configuration of DTC, interrupt controller and BSC can be modified in various ways.

Descriptions so far concern a case where the invention is applied to a single chip microcomputer, one of the fields of application. It is noted, however, that the invention is not limited to this application alone but can also be applied to semiconductor integrated circuit devices such as digital signal processors (DSPs). This invention can be applied to a wide range of semiconductor integrated circuit devices that incorporate at least a data processing device and a data transfer device.

Representative features and advantages of this invention may be briefly summarized as follows.

(1) A first bus used by the data processing device and a second bus used by a data transfer device can be separated from each other. The first bus for the data processing device and the second bus for the data transfer device can be simultaneously used. Further, function blocks or modules required for the operations of the data processing device and the data transfer device are connected by their buses. Transfer information for the data transfer device in particular is provided in a second memory means, and the data transfer device and the second memory means are directly connected through a second bus so that the data transfer device can retrieve the transfer information from the second memory means and perform data transfer according to the retrieved transfer information. Because the transfer information for the data transfer device is provided in the second memory means with high memory density, it is possible to reduce the physical size and manufacture cost of the single chip microcomputer or semiconductor integrated circuit device or to increase the number of transfer channels with an appropriate manufacture cost or while maintaining the size of the chip.

(2) The above feature (1) improves the degree of freedom of system configuration, making the single chip microcomputer easy to use in a variety of ways.

(3) Because the above feature (1) allows the simultaneous operation of the data processing device and the data transfer device, the processing speed of the single chip microcomputer or semiconductor integrated circuit device can be improved.

(4) Because of the features (1) to (3), it is possible to provide a semiconductor integrated circuit device—particularly a single chip microcomputer incorporating a central processing unit and a data transfer device—which can minimize an increase in the physical and logical size, allow data transfers invoked by a large number of interrupts and improve the processing efficiency.

What is claimed is:

1. A semiconductor integrated circuit device on a single semiconductor chip comprising:

a data processing device;

a first memory circuit;

a second memory circuit storing source address data and destination address data;

a data transfer device coupled to receive source address data and destination address data from the second memory circuit, the data transfer device controlling data transfer between addresses designated by the source address data and the destination address data in response to reception of a start signal, wherein the second memory circuit further stores number data specifying the amount of data to be transferred and transfer mode data for a data transfer performed by the data transfer device;

a bus control circuit;

a data input/output circuit having a predetermined address designated by the source address data or the destination address data;

a first bus including a first data bus and a first address bus connected to the data processing device, the bus control circuit and the first memory circuit;

a second bus including a second data bus and a second address bus connected to the data transfer device, the bus control circuit the second memory circuit and the data input/output circuit;

the bus control circuit selectively coupling the first bus and the second bus when the data processing device accesses the second memory or the data input/output circuit, or when the data transfer device accesses the first memory; and the bus control circuit selectively decoupling the first bus and the second bus when the data processing device accesses the first memory or when the data transfer device accesses the second memory or the data input/output circuit, wherein the data processing device connected to the first bus and the data transfer device connected to the second bus are operable in parallel.

2. A semiconductor integrated circuit device comprising:

a data transfer device controlling data transfer between addresses, the data transfer device comprising:

registers for storing source address data, destination address data and number data specifying the amount of data to be transferred;

a mode register for storing transfer mode data; and an arithmetic unit for operating on the source address data, destination address data and/or the number data stored in the registers based on the transfer mode data stored in the mode register; and a memory circuit coupled to the data transfer device for storing a plurality of sets of transfer parameters, each set of transfer parameters including source address data, destination address data, number data and/or transfer mode data;

the transfer mode data including information having a first state and a second state;

wherein the first state enables the data transfer device to perform one or more data transfers based on one set of the transfer parameters in a single data transfer operation, wherein the second state enables the data transfer device to perform a plurality of data transfers based on more than one set of the transfer parameters in a single data transfer operation.

3. A method for transferring data in a semiconductor integrated circuit device comprising the steps of:

storing a plurality of transfer parameters in a memory, wherein the transfer parameters include transfer mode data having either a first state or a second state;

reading a first set of transfer parameters from the memory;

transferring data in accordance with the first set of transfer parameters;

determining whether the transfer mode data is in the first state or the second state;

terminating data transfers if the transfer mode data is in the first state;

reading a second set of transfer parameters from the memory and transferring data in accordance with the second set of transfer parameters if the transfer mode data is in the second state.

4. The method of claim 3, wherein the steps of reading and transferring data in accordance with sets of transfer parameters repeats until it is determined that the transfer mode data included in a set of transfer parameters is in the second state.

5. The method of claim 3, wherein either the first or second transfer parameters specify a block transfer operation.

6. The method of claim 3, wherein either the first or second transfer parameters specify a repeat transfer operation.

7. The method of claim 3, wherein the transferring of data in accordance with the first and second sets of transfer parameters is initiated by an interrupt command from a CPU.

* * * * *

UNITED STATES PATENT AND TRADEMARK OFFICE
CERTIFICATE OF CORRECTION

PATENT NO. : 5,809,259
DATED : Sep. 15, 1998
INVENTOR(S) : Naoli Misuishi

It is certified that error appears in the above-identified patent and that said Letters Patent is hereby corrected as shown below:

In the drawings, Sheet 3, Fig. 3, on the left hand side of the memory map, please delete the third entry down "H'FFFFFF80" and replace it with -- HFFFFF780--.

Signed and Sealed this

Thirteenth Day of July, 1999

Attest:

Attesting Officer

Q. TODD DICKINSON

Acting Commissioner of Patents and Trademarks